(12) United States Patent
Lee et al.

(10) Patent No.: US 12,632,145 B2
(45) Date of Patent: *May 19, 2026

(54) TOUCH INSPECTION DEVICE AND TOUCH INSPECTION METHOD FOR DISPLAY DEVICE

(71) Applicant: Samsung Display Co., LTD., Yongin-si (KR)

(72) Inventors: Seung Rok Lee, Yongin-si (KR); Min Hong Kim, Yongin-si (KR); Hyeon Seo Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,677

(22) Filed: Jul. 23, 2024

(65) Prior Publication Data

US 2025/0130670 A1 Apr. 24, 2025

(30) Foreign Application Priority Data

Oct. 20, 2023 (KR) ........................ 10-2023-0140924

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0446* (2019.05)

(58) Field of Classification Search
CPC ..... G06F 3/0418; G06F 3/0412; G06F 3/0446
See application file for complete search history.

(56) References Cited

U.S. PATENT DOCUMENTS

| | | | |
|---|---|---|---|
| 9,733,293 B1* | 8/2017 | Shen ...................... | G06F 3/0445 |
| 12,189,893 B2* | 1/2025 | Lee ........................ | G06F 3/0418 |
| 2011/0050620 A1* | 3/2011 | Hristov .............. | G06F 3/04184 |
| | | | 345/174 |
| 2020/0293134 A1* | 9/2020 | Shim ..................... | G06F 3/0445 |
| 2021/0075259 A1* | 3/2021 | Jung ........................ | H02J 7/02 |

FOREIGN PATENT DOCUMENTS

| | | |
|---|---|---|
| KR | 10-1935432 B1 | 1/2019 |
| KR | 10-2030635 B1 | 10/2019 |

* cited by examiner

*Primary Examiner* — Liliana Cerullo
(74) *Attorney, Agent, or Firm* — Womble Bond Dickinson (US) LLP

(57) ABSTRACT

In a touch inspection device of a display device, the touch inspection device includes: a loading unit on which a display device is loaded; a touch driving circuit configured to drive touch driving electrodes and touch sensing electrodes on a touch sensing unit of the display device, and to detect touch data for touch nodes formed at intersection portions of the touch driving electrodes and the touch sensing electrodes; and an inspection processing circuit configured to calculate deviations of the touch data, to detect touch error data and at least one touch node in which the touch error data occurs by offsetting the deviations of touch data for each of the touch nodes adjacent to each other, and to detect a defect occurrence location for the at least one touch node in which the touch error data occurs.

20 Claims, 20 Drawing Sheets

| | Tx0 | Tx1 | Tx2 | Tx3 | Tx4 | Tx5 | Tx6 | Tx7 | Tx8 | Tx9 |
|---|---|---|---|---|---|---|---|---|---|---|
| Rx19 | 0 | 20 | 40 | 60 | 80 | 100 | 120 | 140 | 160 | 180 |
| Rx18 | 0 | 20 | 40 | 60 | 80 | 100 | 120 | 140 | 160 | 180 |
| Rx17 | 0 | 20 | 40 | 60 | 80 | 100 | 120 | 140 | 160 | 180 |
| Rx16 | 0 | 20 | 40 | 60 | 80 | 100 | 120 | 140 | 160 | 180 |
| Rx15 | 0 | 20 | 40 | 60 | 80 | 100 | 120 | 140 | 160 | 180 |
| Rx14 | 0 | 20 | 40 | 60 | 80 | 100 | 120 | 140 | 160 | 180 |
| Rx13 | 0 | 20 | 40 | 60 | 80 | 100 | 120 | 140 | 160 | 180 |
| Rx12 | 0 | 20 | 40 | 60 | 80 | 100 | 120 | 140 | 160 | 180 |
| Rx11 | 0 | 20 | 40 | 60 | 80 | 100 | 120 | 140 | 160 | 180 |
| Rx10 | 0 | 20 | 40 | 60 | 80 | 100 | 120 | 140 | 160 | 180 |
| Rx9 | 180 | 160 | 140 | 120 | 100 | 80 | 60 | 40 | 20 | 0 |
| Rx8 | 180 | 160 | 140 | 120 | 100 | 80 | 60 | 40 | 20 | 0 |
| Rx7 | 180 | 160 | 140 | 120 | 100 | 80 | 60 | 40 | 20 | 0 |
| Rx6 | 180 | 160 | 140 | 120 | 100 | 80 | 60 | 40 | 20 | 0 |
| Rx5 | 180 | 160 | 140 | 120 | 100 | 80 | 60 | 40 | 20 | 0 |
| Rx4 | 180 | 160 | 140 | 120 | 100 | 80 | 60 | 40 | 20 | 0 |
| Rx3 | 180 | 160 | 140 | 120 | 100 | 80 | 60 | 40 | 20 | 0 |
| Rx2 | 180 | 160 | 140 | 120 | 100 | 80 | 60 | 40 | 20 | 0 |
| Rx1 | 180 | 160 | 140 | 120 | 100 | 80 | 60 | 40 | 20 | 0 |
| Rx0 | 180 | 160 | 140 | 120 | 100 | 80 | 60 | 40 | 20 | 0 |

FIG. 11

| | Tx0 | Tx1 | Tx2 | Tx3 | Tx4 | Tx5 | Tx6 | Tx7 | Tx8 | Tx9 |
|------|----|----|----|----|----|----|----|----|----|----|
| Rx19 | 90 | 70 | 50 | 30 | 10 | 10 | 30 | 50 | 70 | 90 |
| Rx18 | 90 | 70 | 50 | 30 | 10 | 10 | 30 | 50 | 70 | 90 |
| Rx17 | 90 | 70 | 50 | 30 | 10 | 10 | 30 | 50 | 70 | 90 |
| Rx16 | 90 | 70 | 50 | 30 | 10 | 10 | 30 | 50 | 70 | 90 |
| Rx15 | 90 | 70 | 50 | 30 | 10 | 10 | 30 | 50 | 70 | 90 |
| Rx14 | 90 | 70 | 50 | 30 | 10 | 10 | 30 | 50 | 70 | 90 |
| Rx13 | 90 | 70 | 50 | 30 | 10 | 10 | 30 | 50 | 70 | 90 |
| Rx12 | 90 | 70 | 50 | 30 | 10 | 10 | 30 | 50 | 70 | 90 |
| Rx11 | 90 | 70 | 50 | 30 | 10 | 10 | 30 | 50 | 70 | 90 |
| Rx10 | 90 | 70 | 50 | 30 | 10 | 10 | 30 | 50 | 70 | 90 |
| Rx9  | 90 | 70 | 50 | 30 | 10 | 10 | 30 | 50 | 70 | 90 |
| Rx8  | 90 | 70 | 50 | 30 | 10 | 10 | 30 | 50 | 70 | 90 |
| Rx7  | 90 | 70 | 50 | 30 | 10 | 10 | 30 | 50 | 70 | 90 |
| Rx6  | 90 | 70 | 50 | 30 | 10 | 10 | 30 | 50 | 70 | 90 |
| Rx5  | 90 | 70 | 50 | 30 | 10 | 10 | 30 | 50 | 70 | 90 |
| Rx4  | 90 | 70 | 50 | 30 | 10 | 10 | 30 | 50 | 70 | 90 |
| Rx3  | 90 | 70 | 50 | 30 | 10 | 10 | 30 | 50 | 70 | 90 |
| Rx2  | 90 | 70 | 50 | 30 | 10 | 10 | 30 | 50 | 70 | 90 |
| Rx1  | 90 | 70 | 50 | 30 | 10 | 10 | 30 | 50 | 70 | 90 |
| Rx0  | 90 | 70 | 50 | 30 | 10 | 10 | 30 | 50 | 70 | 90 |

FIG. 12

| | Tx0 | Tx1 | Tx2 | Tx3 | Tx4 | Tx5 | Tx6 | Tx7 | Tx8 | Tx9 |
|------|---|---|---|---|---|---|---|---|---|---|
| Rx19 | | | | | | | | | | |
| Rx18 | | | | | | | | | | |
| Rx17 | | | | | | | | | | |
| Rx16 | | | | | | | | | | |
| Rx15 | | | | | | | | | | |
| Rx14 | | | | | | | | | | |
| Rx13 | | | | | | | | | | |
| Rx12 | | | | | | | | | | |
| Rx11 | | | | | | | | | | |
| Rx10 | | | | | | | | | | |
| Rx9 | | | | | | | | | | |
| Rx8 | | | | | | | | | | |
| Rx7 | | | | | | | | | | |
| Rx6 | | | | | | | | | | |
| Rx5 | | | | | | | | | | |
| Rx4 | | | | | | | | | | |
| Rx3 | | | | | | | | | | |
| Rx2 | | | | | | | | | | |
| Rx1 | | | | | | | | | | |
| Rx0 | | | | | | | | | | |

FIG. 13

| | Tx0 | Tx1 | Tx2 | Tx3 | Tx4 | Tx5 | Tx6 | Tx7 | Tx8 | Tx9 |
|---|---|---|---|---|---|---|---|---|---|---|
| Rx19 | 85 | 65 | 45 | 25 | 5 | 15 | 35 | 55 | 25 | 95 |
| Rx18 | 85 | 65 | 45 | 25 | 5 | 15 | 35 | 55 | 25 | 95 |
| Rx17 | 85 | 65 | 45 | 25 | 5 | 15 | 35 | 55 | 25 | 95 |
| Rx16 | 85 | 65 | 45 | 25 | 5 | 15 | 35 | 55 | 25 | 95 |
| Rx15 | 85 | 65 | 45 | 25 | 5 | 15 | 35 | 55 | 25 | 95 |
| Rx14 | 85 | 65 | 45 | 25 | 5 | 15 | 35 | 55 | 25 | 95 |
| Rx13 | 85 | 65 | 45 | 25 | 5 | 15 | 35 | 55 | 25 | 95 |
| Rx12 | 85 | 65 | 45 | 25 | 5 | 15 | 35 | 55 | 25 | 95 |
| Rx11 | 85 | 65 | 45 | 25 | 5 | 15 | 35 | 55 | 25 | 95 |
| Rx10 | 85 | 65 | 45 | 25 | 5 | 15 | 35 | 55 | 25 | 95 |
| Rx9 | 95 | 75 | 55 | 35 | 15 | 5 | 25 | 45 | 115 | 85 |
| Rx8 | 95 | 75 | 55 | 35 | 15 | 5 | 25 | 45 | 115 | 85 |
| Rx7 | 95 | 75 | 55 | 35 | 15 | 5 | 25 | 45 | 115 | 85 |
| Rx6 | 95 | 75 | 55 | 35 | 15 | 5 | 25 | 45 | 115 | 85 |
| Rx5 | 95 | 75 | 55 | 35 | 15 | 5 | 25 | 45 | 115 | 85 |
| Rx4 | 95 | 75 | 55 | 35 | 15 | 5 | 25 | 45 | 115 | 85 |
| Rx3 | 95 | 75 | 55 | 35 | 15 | 5 | 25 | 45 | 115 | 85 |
| Rx2 | 95 | 75 | 55 | 35 | 15 | 5 | 25 | 45 | 115 | 85 |
| Rx1 | 95 | 75 | 55 | 35 | 15 | 5 | 25 | 45 | 115 | 85 |
| Rx0 | 95 | 75 | 55 | 35 | 15 | 5 | 25 | 45 | 115 | 85 |

FIG. 14

| | Rx19 | Rx18 | Rx17 | Rx16 | Rx15 | Rx14 | Rx13 | Rx12 | Rx11 | Rx10 | Rx9 | Rx8 | Rx7 | Rx6 | Rx5 | Rx4 | Rx3 | Rx2 | Rx1 | Rx0 |
|---|---|---|---|---|---|---|---|---|---|---|---|---|---|---|---|---|---|---|---|---|
| Tx0 | ' | ' | ' | ' | ' | ' | ' | ' | ' | 10 | ' | ' | ' | ' | ' | ' | ' | ' | ' | |
| Tx1 | ' | ' | ' | ' | ' | ' | ' | ' | ' | 10 | ' | ' | ' | ' | ' | ' | ' | ' | ' | |
| Tx2 | ' | ' | ' | ' | ' | ' | ' | ' | ' | 10 | ' | ' | ' | ' | ' | ' | ' | ' | ' | |
| Tx3 | ' | ' | ' | ' | ' | ' | ' | ' | ' | 10 | ' | ' | ' | ' | ' | ' | ' | ' | ' | |
| Tx4 | ' | ' | ' | ' | ' | ' | ' | ' | ' | 10 | ' | ' | ' | ' | ' | ' | ' | ' | ' | |
| Tx5 | ' | ' | ' | ' | ' | ' | ' | ' | ' | 10 | ' | ' | ' | ' | ' | ' | ' | ' | ' | |
| Tx6 | ' | ' | ' | ' | ' | ' | ' | ' | ' | 10 | ' | ' | ' | ' | ' | ' | ' | ' | ' | |
| Tx7 | ' | ' | ' | ' | ' | ' | ' | ' | ' | 10 | ' | ' | ' | ' | ' | ' | ' | ' | ' | |
| Tx8 | ' | ' | ' | ' | ' | ' | ' | ' | ' | 90 | ' | ' | ' | ' | ' | ' | ' | ' | ' | |
| Tx9 | ' | ' | ' | ' | ' | ' | ' | ' | ' | 10 | ' | ' | ' | ' | ' | ' | ' | ' | ' | |

FIG. 15

| | Tx0 | Tx1 | Tx2 | Tx3 | Tx4 | Tx5 | Tx6 | Tx7 | Tx8 | Tx9 |
|---|---|---|---|---|---|---|---|---|---|---|
| Rx19 | 0 | 0 | 0 | 0 | 0 | 0 | 0 | 0 | 0 | 0 |
| Rx18 | 0 | 0 | 0 | 0 | 0 | 0 | 0 | 0 | 0 | 0 |
| Rx17 | 0 | 0 | 0 | 0 | 0 | 0 | 0 | 0 | 0 | 0 |
| Rx16 | 0 | 0 | 0 | 0 | 0 | 0 | 0 | 0 | 0 | 0 |
| Rx15 | 0 | 0 | 0 | 0 | 0 | 0 | 0 | 0 | 0 | 0 |
| Rx14 | 0 | 0 | 0 | 0 | 0 | 0 | 0 | 0 | 0 | 0 |
| Rx13 | 0 | 0 | 0 | 0 | 0 | 0 | 0 | 0 | 0 | 0 |
| Rx12 | 0 | 0 | 0 | 0 | 0 | 0 | 0 | 0 | 0 | 0 |
| Rx11 | 0 | 0 | 0 | 0 | 0 | 0 | 0 | 0 | 0 | 0 |
| Rx10 | 6 | 6 | 6 | 6 | 6 | 6 | 6 | 6 | 54 | 6 |
| Rx9 | 0 | 0 | 0 | 0 | 0 | 0 | 0 | 0 | 0 | 0 |
| Rx8 | 0 | 0 | 0 | 0 | 0 | 0 | 0 | 0 | 0 | 0 |
| Rx7 | 0 | 0 | 0 | 0 | 0 | 0 | 0 | 0 | 0 | 0 |
| Rx6 | 0 | 0 | 0 | 0 | 0 | 0 | 0 | 0 | 0 | 0 |
| Rx5 | 0 | 0 | 0 | 0 | 0 | 0 | 0 | 0 | 0 | 0 |
| Rx4 | 0 | 0 | 0 | 0 | 0 | 0 | 0 | 0 | 0 | 0 |
| Rx3 | 0 | 0 | 0 | 0 | 0 | 0 | 0 | 0 | 0 | 0 |
| Rx2 | 0 | 0 | 0 | 0 | 0 | 0 | 0 | 0 | 0 | 0 |
| Rx1 | 0 | 0 | 0 | 0 | 0 | 0 | | | | |
| Rx0 | | | | | | | | | | |

| | Tx0 | Tx1 | Tx2 | Tx3 | Tx4 | Tx5 | Tx6 | Tx7 | Tx8 | Tx9 |
|---|---|---|---|---|---|---|---|---|---|---|
| Rx19 | 0 | 0 | 0 | 0 | 0 | 0 | 0 | 0 | 0 | 0 |
| Rx18 | 0 | 0 | 0 | 0 | 0 | 0 | 0 | 0 | 0 | 0 |
| Rx17 | 0 | 0 | 0 | 0 | 0 | 0 | 0 | 0 | 0 | 0 |
| Rx16 | 0 | 0 | 0 | 0 | 0 | 0 | 0 | 0 | 0 | 0 |
| Rx15 | 0 | 0 | 0 | 0 | 0 | 0 | 0 | 0 | 0 | 0 |
| Rx14 | 0 | 0 | 0 | 0 | 0 | 0 | 0 | 0 | 0 | 0 |
| Rx13 | 0 | 0 | 0 | 0 | 0 | 0 | 0 | 0 | 0 | 0 |
| Rx12 | 0 | 0 | 0 | 0 | 0 | 0 | 0 | 0 | 0 | 0 |
| Rx11 | 0 | 0 | 0 | 0 | 0 | 0 | 0 | 0 | 0 | 0 |
| Rx10 | 2 | 2 | 2 | 2 | 2 | 2 | 2 | 2 | 18 | 2 |
| Rx9 | 0 | 0 | 0 | 0 | 0 | 0 | 0 | 0 | 0 | 0 |
| Rx8 | 0 | 0 | 0 | 0 | 0 | 0 | 0 | 0 | 0 | 0 |
| Rx7 | 0 | 0 | 0 | 0 | 0 | 0 | 0 | 0 | 0 | 0 |
| Rx6 | 0 | 0 | 0 | 0 | 0 | 0 | 0 | 0 | 0 | 0 |
| Rx5 | 0 | 0 | 0 | 0 | 0 | 0 | 0 | 0 | 0 | 0 |
| Rx4 | 0 | 0 | 0 | 0 | 0 | 0 | 0 | 0 | 0 | 0 |
| Rx3 | 0 | 0 | 0 | 0 | 0 | 0 | 0 | 0 | 0 | 0 |
| Rx2 | 0 | 0 | 0 | 0 | 0 | 0 | 0 | 0 | 0 | 0 |
| Rx1 | 0 | 0 | 0 | | | | | | | |
| Rx0 | | | | | | | | | | |

TOUCH INSPECTION DEVICE AND TOUCH INSPECTION METHOD FOR DISPLAY DEVICE

CROSS-REFERENCE TO RELATED APPLICATION

The present application claims priority to and the benefit of Korean Patent Application No. 10-2023-0140924, filed on Oct. 20, 2023, in the Korean Intellectual Property Office, the entire disclosure of which is incorporated herein by reference.

BACKGROUND

1. Field

Aspects of some embodiments of the present disclosure relate to a touch inspection device and a touch inspection method for a display device.

2. Description of the Related Art

As an information society develops, consumer demand for display devices for displaying images is increasing in various forms. For example, display devices may be applied to various electronic devices such as smartphones, digital cameras, laptop computers, navigation devices, and smart televisions.

A display device may be a flat panel display device such as a liquid crystal display device, a field emission display device, or an organic light emitting display device. Among flat panel display devices, a light emitting display device may include a light emitting element in which each of the pixels of a display panel may emit light by itself, thereby displaying images without a backlight unit providing the light to the display panel.

Display devices may include a touch sensing module for sensing a user's touch as one of input interfaces. The touch sensing module may include a touch sensing unit in which touch electrodes are arranged, and a touch driving circuit detecting an amount of charge charged in capacitance between the touch electrodes. The touch sensing module may be mass-produced in a state integrally formed on an image display unit of the display device or mounted on a front surface of the image display unit.

The above information disclosed in this Background section is only for enhancement of understanding of the background and therefore the information discussed in this Background section does not necessarily constitute prior art.

SUMMARY

Aspects of some embodiments of the present disclosure may include a touch inspection device and a touch inspection method that may be capable of relatively accurately detecting defects in touch driving electrodes when inspecting touch sensing defects in a touch sensing unit or a display device where touch sensing electrodes are respectively connected to a touch driving circuit in different directions, such as left and right directions.

Aspects of some embodiments of the present disclosure may also include a touch inspection device and a touch inspection method that may be capable of relatively accurately detecting a specific node or touch location where a touch sensing defect occurs, including a defect in at least one touch driving electrode, when inspecting a touch of display devices.

However, aspects of embodiments according to the present disclosure are not restricted to those set forth herein. The above and other aspects of embodiments according to the present disclosure will become more apparent to one of ordinary skill in the art to which the present disclosure pertains by referencing the detailed description of the present disclosure given below.

According to some embodiments of the present disclosure, in a touch inspection device of a display device, the touch inspection device includes a loading unit on which a display device is loaded, a touch driving circuit that drives touch driving electrodes and touch sensing electrodes on a touch sensing unit of the display device, and detects touch data for touch nodes formed at intersection portions of the touch driving electrodes and the touch sensing electrodes, and an inspection processing circuit that calculates deviations of the touch data, detects touch error data and at least one touch node in which the touch error data occurs by offsetting the deviations of touch data for each of the touch nodes adjacent to each other, and detects a defect occurrence location for the at least one touch node in which the touch error data occurs.

According to some embodiments, the touch sensing electrodes are arranged in parallel in a first direction in a touch sensing area of the touch sensing unit, and the touch driving electrodes are arranged in parallel in a second direction intersecting the touch sensing electrodes, touch sensing electrodes in an upper direction in the second direction with respect to a center of the touch sensing area among the touch sensing electrodes are electrically connected to the touch driving circuit through touch sensing lines connected in a first side direction, and touch sensing electrodes in a lower direction in the second direction with respect to the center of the touch sensing area among the touch sensing electrodes are electrically connected to the touch driving circuit through touch sensing lines connected in a second side direction opposite to the first side direction.

According to some embodiments, the inspection processing circuit aligns the touch data for the touch nodes in units of at least one frame, calculates a deviation of the touch data for the at least one frame according to an arrangement direction of the touch sensing electrodes, detects the touch error data and the at least one touch node in which the touch error data occurs by offsetting the deviations of the touch data adjacent to each other along an arrangement direction of the touch driving electrodes, and determines a location of the at least one touch node in which the touch error data occurs to be a defect occurrence location.

According to some embodiments of the present disclosure, in a touch inspection method of a display device, the touch inspection method includes loading a display device onto a loading unit, driving touch driving electrodes and touch sensing electrodes on a touch sensing unit of the display device, and detecting touch data for touch nodes formed at intersection portions of the touch driving electrodes and the touch sensing electrodes, through a touch driving circuit, and calculating deviations of the touch data, detecting touch error data and at least one touch node in which the touch error data occurs by offsetting the deviations of touch data for each of the touch nodes adjacent to each other, and detecting a defect occurrence location for the at least one touch node in which the touch error data occurs, by using an inspection processing circuit.

According to some embodiments, the touch sensing electrodes are arranged in parallel in a first direction in a touch sensing area of the touch sensing unit, and the touch driving electrodes are arranged in parallel in a second direction intersecting the touch sensing electrodes, touch sensing electrodes in an upper direction in the second direction with respect to a center of the touch sensing area among the touch sensing electrodes are electrically connected to the touch driving circuit through touch sensing lines connected in a first side direction, and touch sensing electrodes in a lower direction in the second direction with respect to the center of the touch sensing area among the touch sensing electrodes are electrically connected to the touch driving circuit through touch sensing lines connected in a second side direction opposite to the first side direction.

According to some embodiments, the detecting of the defect occurrence location for the at least one touch node in which the touch error data occurs includes aligning the touch data for the touch nodes in units of at least one frame, calculating the deviations of the touch data for the at least one frame according to an arrangement direction of the touch sensing electrodes, detecting the touch error data and the at least one touch node in which the touch error data occurs by offsetting the deviations of the touch data adjacent to each other according to an arrangement direction of the touch driving electrodes, and determining a location of the at least one touch node in which the touch error data occurs to be a defect occurrence location.

The touch inspection device and the touch inspection method for the display device according to some embodiments of the present disclosure may relatively increase a defect detection accuracy when inspecting touch sensing defects in the touch sensing unit or the display device where the touch sensing electrodes are respectively connected to the touch driving circuit in different directions, such as left and right directions.

In addition, touch inspection efficiency and reliability may be relatively improved by relatively accurately detecting the specific node or touch location where the touch sensing defect occurs, including a defect in at least one touch driving electrode.

However, the characteristics of embodiments according to the present disclosure are not restricted to this specifically described herein. The above and other characteristics of embodiments according to the present disclosure will become more apparent to one of ordinary skill in the art to which the embodiments pertain by referencing the claims and their equivalents.

BRIEF DESCRIPTION OF THE DRAWINGS

The above and other aspects and features of embodiments according to the present disclosure will become more apparent by describing in more detail aspects of some embodiments thereof with reference to the attached drawings, in which:

FIG. 10 is a view illustrating the alignment of touch capacity data for each touch node of the touch sensing unit illustrated in FIG. 6 according to some embodiments;

FIG. 11 is a view illustrating the results of deviation calculation for the touch capacitance data for each touch node of the touch sensing unit according to some embodiments;

FIG. 12 is a view illustrating the results of vertical deviation offset for the touch capacitance data for each touch node according to some embodiments;

FIG. 13 is a view illustrating the results of deviation calculation for the touch capacitance data for each touch node of the touch sensing unit according to some embodiments;

FIG. 14 is a view illustrating the results of vertical deviation offset for the touch capacitance data for each touch node according to some embodiments;

FIG. 15 is a view illustrating the results of vertical deviation offset for the touch capacitance data for each touch node according to some embodiments;

DETAILED DESCRIPTION

Aspects of some embodiments of the present disclosure will now be described more fully hereinafter with reference to the accompanying drawings, in which aspects of some embodiments of the present disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, specific embodiments will be described with reference to the accompanying drawings.

Figure 1:
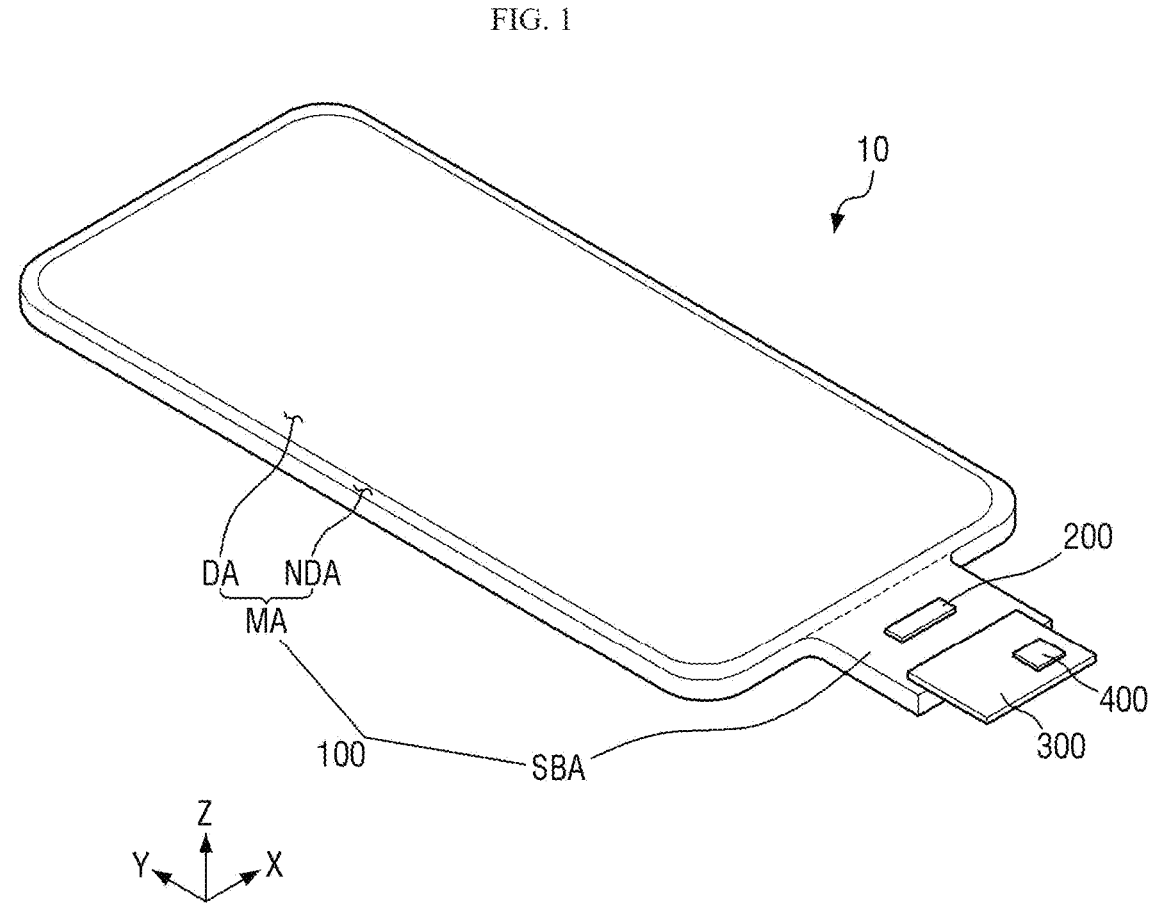
FIG. 1 is a perspective view illustrating a display device according to some embodiments.

FIG. 1 is a perspective view illustrating a display device according to some embodiments. In addition, FIG. 2 is a plan view illustrating the display device according to some embodiments, and FIG. 3 is a side view illustrating the display device according to some embodiments.

Figure 2:
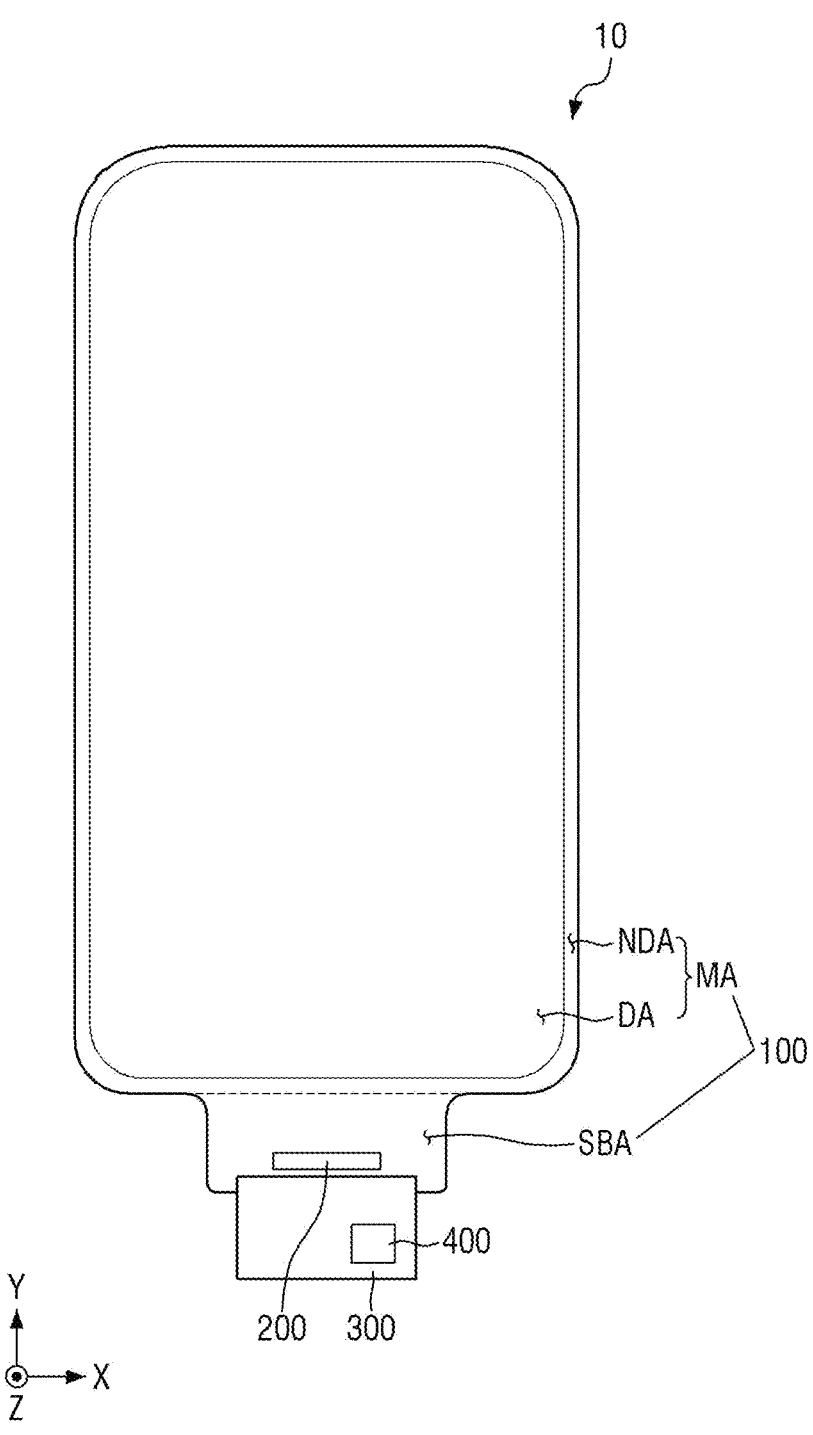
FIG. 2 is a plan view illustrating the display device according to some embodiments.
Figure 3:
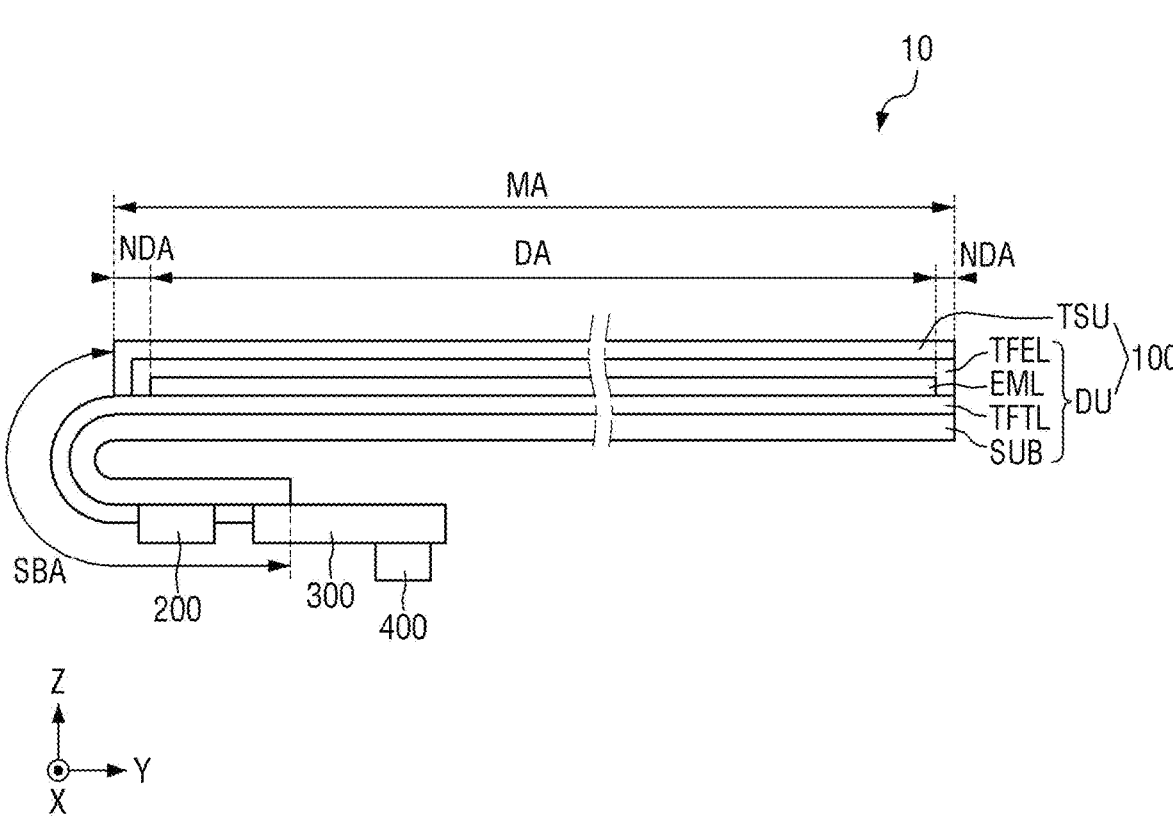
FIG. 3 is a side view illustrating the display device according to some embodiments.

Referring to FIGS. 1 to 3, a display device 10 according to some embodiments may be applied to portable electronic devices such as a mobile phone, a smartphone, a tablet personal computer (PC), a mobile communication terminal, an electronic notebook, an electronic book, a portable multimedia player (PMP), navigation, and an ultra mobile PC (UMPC). Alternatively, the display device 10 according to some embodiments may be applied as a display unit of a television, a laptop computer, a monitor, a billboard, or the Internet of Things (IOT). Alternatively, the display device 10 according to some embodiments may be applied to wearable devices such as a smart watch, a watch phone, a glasses-type display, and a head mounted display (HMD). Alternatively, the display device 10 according to some embodiments may be applied to an instrument panel of a vehicle, a center fascia of a vehicle, a center information display (CID) located on a dashboard of a vehicle, a room mirror display substituting for a side mirror of a vehicle, or a display located on a rear surface of a front seat as entertainment for a rear seat of a vehicle.

The display device 10 according to some embodiments may be a light emitting display device such as an organic light emitting display device using an organic light emitting diode, a quantum dot light emitting display device including a quantum dot light emitting layer, an inorganic light emitting display device including an inorganic semiconductor, and a micro light emitting display device using a micro or nano light emitting diode (LED). Hereinafter, it is mainly described that the display device 10 according to some embodiments is an organic light emitting display device, but embodiments according to the present disclosure are not limited thereto, and various other display devices may be utilized.

The display device 10 according to some embodiments includes a display panel 100, a display driving circuit 200, a display circuit board 300, and a touch driving circuit 400.

The display panel 100 may be formed in a rectangular plane having short sides in a first direction (X-axis direction) and long sides in a second direction (Y-axis direction) intersecting the first direction (X-axis direction). A corner where the short side in the first direction (X-axis direction) and the long side in the second direction (Y-axis direction) meet may be rounded to have a predetermined curvature or may be formed at a right angle. The planar shape of the display panel 100 is not limited to the quadrangular shape, and may be other polygonal shapes, a circular shape, or an elliptical shape. The display panel 100 may be formed to be flat, but embodiments according to the present disclosure are not limited thereto. For example, the display panel 100 includes curved portions that are formed at left and right distal ends and have a constant curvature or a varying curvature. In addition, the display panel 100 may be flexibly formed to be curved, bent, folded, or rolled.

The display panel 100 includes a main area MA and a sub-area SBA.

The main area MA includes a display area DA capable of displaying images and a non-display area NDA which is a peripheral area (e.g., outside a periphery or footprint) of the display area DA in a plan view. The display area DA includes pixels configured to collectively display images. The sub-area SBA may protrude from one side of the main area MA in the second direction (Y-axis direction).

It is illustrated in FIGS. 1 and 2 that the sub-area SBA is unfolded, but the sub-area SBA may be bent as illustrated in FIG. 3, and in this case, the sub-area SBA may be located on a lower surface of the display panel 100. When the sub-area SBA is bent, the sub-area SBA may overlap the main area MA in a third direction (Z-axis direction) which is a thickness direction of a substrate SUB. The display driving circuit 200 may be located in the sub-area SBA.

In addition, the display panel 100 includes a display module DU including a substrate SUB, a thin film transistor layer TFTL, a light emitting element layer EML, and an encapsulation layer TFEL, and a touch sensing unit TSU formed on a front surface of the display module DU, as illustrated in FIG. 3.

The thin film transistor layer TFTL may be located on the substrate SUB. The thin film transistor layer TFTL may be located in the main area MA and the sub-area SBA. The thin film transistor layer TFTL includes thin film transistors.

A light emitting element layer EML may be located on the thin film transistor layer TFTL. The light emitting element layer EML may be located in the display area DA of the main area MA. The light emitting element layer EML includes light emitting elements located in light emitting portions.

The encapsulation layer TFEL may be located on the light emitting element layer EML. The encapsulation layer TFEL may be located in the display area DA and the non-display area NDA of the main area MA. The encapsulation layer TFEL includes at least one inorganic layer and at least one organic layer for encapsulating the light emitting element layer.

The touch sensing unit TSU may be formed or mounted on the encapsulation layer TFEL. The touch sensing unit TSU may be located on the display area DA of the main area MA. The touch sensing unit TSU may sense a touch of a person or an object using touch electrodes.

A cover window for protecting an upper portion of the display panel 100 may be located on the touch sensing unit TSU. The cover window may be attached onto the touch sensing unit TSU by a transparent adhesive member such as an optically clear adhesive (OCA) film or an optically clear resin (OCR). The cover window may also be made of an inorganic material such as glass or also be made of an organic material such as plastic or a polymer material. In order to prevent or reduce deterioration of visibility of an image due to reflection of external light, a polarizing layer may be additionally located between the touch sensing unit TSU and the cover window.

The display driving circuit 200 may generate control signals and data voltages for driving the display panel 100. The display driving circuit 200 may be formed as an integrated circuit (IC) and may be attached onto the display panel 100 in a chip on glass (COG) manner, a chip on plastic (COP) manner, or an ultrasonic bonding manner, but embodiments according to the present disclosure are not limited thereto. For example, the display driving circuit 200 may be attached onto the display circuit board 300 in a chip on film (COF) method.

The display circuit board 300 may be attached to one end of the sub-area SBA of the display panel 100. Therefore, the display circuit board 300 may be electrically connected to the display panel 100 and the display driving circuit 200. The display panel 100 and the display driving circuit 200 may receive digital video data, timing control signals, and driving voltages through the display circuit board 300. The display circuit board 300 may be a flexible film such as a flexible printed circuit board, a printed circuit board, or a chip on film.

The touch driving circuit 400 may be located on the display circuit board 300. The touch driving circuit 400 may be formed as an integrated circuit (IC) and attached to the display circuit board 300.

The touch driving circuit 400 may be electrically connected to the touch electrodes of the touch sensing unit TSU. The touch driving circuit 400 applies touch driving signals to the touch electrodes of the touch sensing unit TSU, and measures an amount of charge change in mutual capacitance of each of a plurality of touch nodes formed by the touch electrodes. For example, the touch driving circuit 400 measures a change in capacitance of the plurality of touch nodes according to a change in the magnitude of a voltage or the amount of current of a touch sensing signal received through the touch electrodes.

The touch driving circuit 400 may determine whether or not a user's touch is made, whether or not a user's approach is made, and the like, according to the amount of charge change in the mutual capacitance of each of the plurality of touch nodes. The user's touch indicates that a user's finger or an object such as a pen comes into direct contact with one surface of the cover window located on the touch sensing unit TSU. The user's approach indicates that the user's finger or the object such as the pen hovers above one surface of the cover window.

The touch driving circuit 400 may extract touch coordinates or switch a driving mode by itself by compensating the touch sensing signals according to a noise application level according to a low-temperature driving, a charging mode, a high-frequency application, an electromagnetic noise application state, and the like. For example, the touch driving circuit 400 may sense a user's touch by selectively changing a touch sensing area according to whether a body portion positioned in a front direction of the display panel 100 is detected, and may also change the driving mode to a low power mode or a standby mode.

Figure 4:
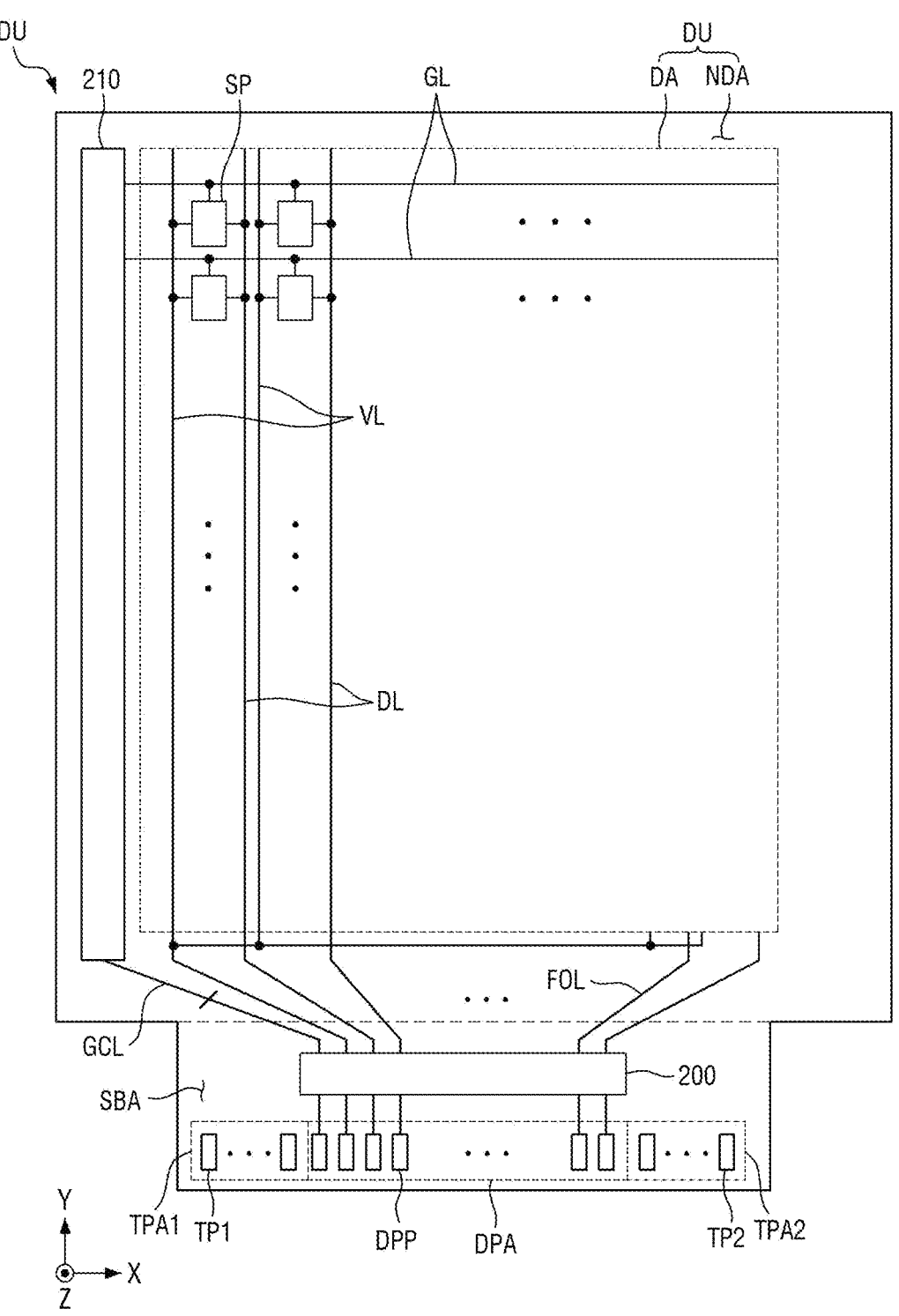
FIG. 4 is a layout view schematically illustrating an example of a display panel illustrated in FIGS. 1 to 3.

FIG. 4 is a layout view schematically illustrating an example of a display panel illustrated in FIGS. 1 to 3. For example, FIG. 4 is a layout view illustrating a display area DA and a non-display area NDA of the display module DU before the touch sensing unit TSU is formed.

The display area DA, which is an area at which images may be displayed, may be defined as a central area of the display panel 100. The display area DA may include a plurality of pixels SP, a plurality of gate lines GL, a plurality of data lines DL, and a plurality of power lines VL. Each of the plurality of pixels SP may be defined as a minimum unit for outputting light.

The plurality of gate lines GL may supply a gate signal received from a gate driver 210 to the plurality of pixels SP. The plurality of gate lines GL may extend in the X-axis direction and may be spaced apart from each other in the Y-axis direction intersecting the X-axis direction.

The plurality of data lines DL may supply the data voltage received from the display driving circuit 200 to the plurality of pixels SP. The plurality of data lines DL may extend in the Y-axis direction and may be spaced apart from each other in the X-axis direction.

The plurality of power lines VL may supply a power voltage received from the display driving circuit 200 to the plurality of pixels SP. Here, the power voltage may be at least one of a driving voltage, an initialization voltage, or a reference voltage. The plurality of power lines VL may extend in the Y-axis direction and may be spaced apart from each other in the X-axis direction.

The non-display area NDA may surround (e.g., in a periphery or outside a footprint of) the display area DA. The non-display area NDA may include a gate driver 210, fan-out lines FOL, and gate control lines GCL. The gate driver 210 may generate a plurality of gate signals based on gate control signals, and may sequentially supply the plurality of gate signals to the plurality of gate lines GL according to a set order.

The fan-out lines FOL may extend from the display driving circuit 200 to the display area DA. The fan-out lines FOL may supply the data voltage received from the display driving circuit 200 to the plurality of data lines DL.

The gate control line GCL may extend from the display driving circuit 200 to the gate driver 210. The gate control line GCL may supply the gate control signal received from the display driving circuit 200 to the gate driver 210.

The sub-area SBA may include a display driving circuit 200, a display pad area DPA, and first and second touch pad areas TPA1 and TPA2.

The display driving circuit 200 may output timing control signals and data voltages for driving the display panel 100 to the fan-out lines FOL. The display driving circuit 200 generates gate control signals according to a display driving frequency set in firmware based on preset display control firmware, and generates data voltages corresponding to image data. In addition, the display driving circuit 200 may supply the data voltage to the data lines DL through the fan-out lines FOL according to the display driving frequency set in the firmware. Here, the data voltage may be supplied to the plurality of pixels SP and may determine a luminance of the plurality of pixels SP. In addition, the display driving circuit 200 may supply the gate control signals generated according to the display driving frequency and gate voltage value of the firmware to the gate driver 210 through the gate control line GCL.

The display pad area DPA, the first touch pad area TPA1, and the second touch pad area TPA2 may be located at an edge of the sub-area SBA. The display pad area DPA, the first touch pad area TPA1, and the second touch pad area TPA2 may be electrically connected to the circuit board 300 using an anisotropic conductive layer or a low-resistance and high-reliability material such as SAP.

The display pad area DPA may include a plurality of display pad portions. The plurality of display pad portions may be connected to a separate main processor through the circuit board 300. The plurality of display pad portions may be connected to the circuit board 300 to receive digital video data and supply the digital video data to the display driving circuit 200.

Figure 5:
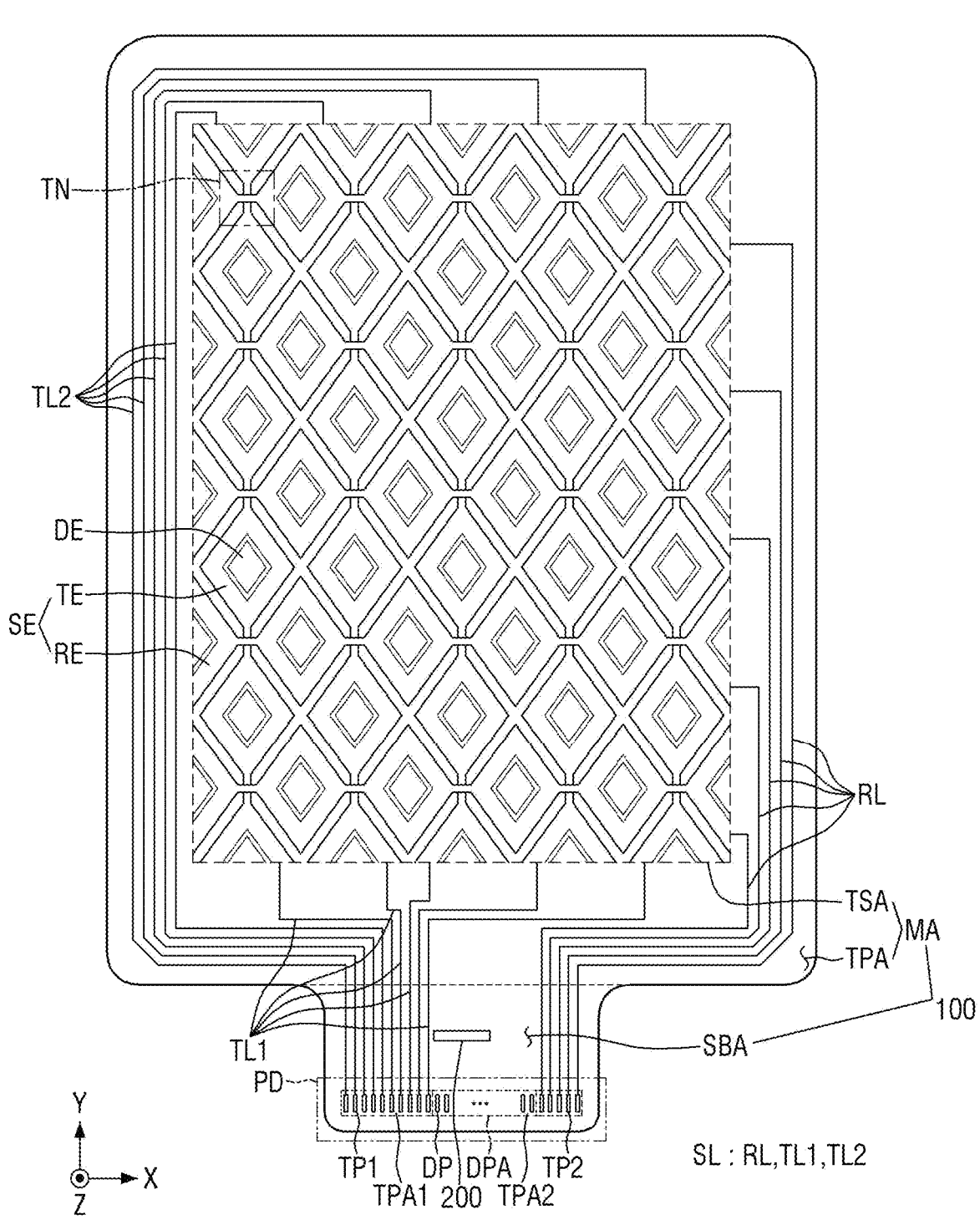
FIG. 5 is a layout view schematically illustrating further details of a structure of a touch sensing unit illustrated in FIG. 3 according to some embodiments.

FIG. 5 is a layout view schematically illustrating a structure according to a first example of a touch sensing unit illustrated in FIG. 3.

It is mainly described in FIG. 5 that touch electrodes SE of the main area MA include two types of electrodes, for example, touch driving electrodes TE and touch sensing electrodes RE, and are driven in a mutual capacitive manner of sensing an amount of charge change in a mutual capacitance of each of a plurality of touch nodes through the touch sensing electrodes RE after applying touch driving signals to the touch driving electrodes TE, but embodiments according to the present disclosure are not limited thereto.

In FIG. 5, for convenience of explanation, only the touch driving electrodes TE, the touch sensing electrodes RE, dummy patterns DE, touch lines SL, and first and second touch pads TP1 and TP2 are illustrated.

Referring to FIG. 5, the main area MA of the touch sensing unit TSU includes a touch sensing area TSA for sensing a user's touch and a touch peripheral area TPA arranged around the touch sensing area TSA. The touch sensing area TSA may overlap the display area DA of FIGS. 1 to 4, and the touch peripheral area TPA may overlap the non-display area NDA.

The touch driving electrodes TE, the touch sensing electrodes RE, and the dummy patterns DE are located in the touch sensing area TSA. The touch driving electrodes TE and the touch sensing electrodes RE may be electrodes for forming mutual capacitance to sense a touch of an electronic pen or the human body.

The touch sensing electrodes RE may be arranged in parallel in the first direction (X-axis direction) and the second direction (Y-axis direction). The touch sensing electrodes RE may be electrically connected to each other in the first direction (X-axis direction). The touch sensing electrodes RE adjacent to each other in the first direction (X-axis direction) may be connected to each other. The touch sensing electrodes RE adjacent to each other in the second direction (Y-axis direction) may be electrically separated from each other. As a result, a touch node TN at which a mutual capacitance is formed may be located at each of intersection portions between the touch driving electrodes TE and the touch sensing electrodes RE. A plurality of touch nodes TN may correspond to the intersection portions between the touch driving electrodes TE and the touch sensing electrodes RE.

The touch driving electrodes TE may be arranged in parallel in the first direction (X-axis direction) and the second direction (Y-axis direction). The touch driving electrodes TE adjacent to each other in the first direction (X-axis direction) may be electrically separated from each other. The touch driving electrodes TE may be electrically connected to each other in the second direction (Y-axis direction). The touch driving electrodes TE adjacent to each other in the second direction (Y-axis direction) may be connected to each other through a separate connection electrode.

Each of the dummy patterns DE may be arranged to be surrounded by the touch driving electrode TE or the touch sensing electrode RE. Each of the dummy patterns DE may be separated from the touch driving electrode TE or the touch sensing electrode RE. Each of the dummy patterns DE may be spaced apart from the touch driving electrode TE or the touch sensing electrode RE. Each of the dummy patterns DE may be electrically floated.

It is illustrated in FIG. 5 that each of the touch driving electrodes TE, the touch sensing electrodes RE, and the dummy patterns DE has a rhombic planar shape, but embodiments according to the present disclosure are not limited thereto. For example, each of the touch driving electrodes TE, the touch sensing electrodes RE, and the dummy patterns DE may have a planar shape such as a quadrangle other than a rhombus, a polygon other than a quadrangle, a circle, or an oval. In addition, the touch driving electrodes TE and the touch sensing electrodes RE may also be formed in a coil-shaped pattern.

The touch lines SL may be located in the touch peripheral area TPA. The touch lines SL includes first touch driving lines TL1 and second touch driving lines TL2 connected to the touch driving electrodes TE, and touch sensing lines RL connected to the touch sensing electrodes RE.

Each of the touch sensing electrodes RE located at an end on one side or the other side of the touch sensing area TSA may be connected to the touch sensing lines RL in a one-to-one manner. For example, as illustrated in FIG. 5, each of the touch sensing electrodes RE located at a right end (right in the drawing) among the touch sensing electrodes RE electrically connected to each other in the first direction (X-axis direction) may be connected to each of the touch sensing lines RL. In addition, each of the touch sensing lines RL may be connected to the second touch pads TP2 located on the pad portion PD in a one-to-one manner. Unlike this, each of the touch sensing electrodes RE located at a left end (left in the drawing) among the touch sensing electrodes RE electrically connected to each other in the first direction (X-axis direction) may also be connected to each of the touch sensing lines RL. The structure in which each touch sensing line RL is connected in different directions will be further described in more detail below.

The touch driving electrodes TE located at an end on one side of the touch sensing area TSA may be connected to the first touch driving lines TL1 in a one-to-one manner, and the touch driving electrodes TE located at an end on the other side of the touch sensing area TSA may be connected to the second touch driving lines TL2 in a one-to-one manner. For example, the touch driving electrodes TE located at an end on a lower side (e.g., in a lower direction in the drawing) among the touch driving electrodes TE electrically connected to each other in the second direction (Y-axis direction) may be each connected to the first touch driving lines TL1, and the touch driving electrodes TE located at an end on an upper side (e.g., an upper direction in the drawing) among the touch driving electrodes TE electrically connected to each other in the second direction (Y-axis direction) may be each connected to the second touch driving lines TL2. The second touch driving lines TL2 may be connected to the touch driving electrodes TE at an upper side of the touch sensing area TSA via a left outer side of the touch sensing area TSA.

The first touch driving lines TL1 and the second touch driving lines TL2 may be connected to the first touch pads TP1 located on the pad portion PD in a one-to-one manner. The touch driving electrodes TE are connected to the first and second touch driving lines TL1 and TL2 at both sides (e.g., upper and lower directions in the drawing) of the touch sensing area TSA to receive a touch driving signal. Therefore, it is possible to prevent or reduce an occurrence of a difference in electrical characteristics (e.g., voltage magnitude) between the touch driving signal applied to the touch driving electrodes TE located on a lower side of the touch sensing area TSA and the touch driving signal applied to the touch driving electrodes TE located on an upper side of the touch sensing area TSA due to an RC delay.

As illustrated in FIGS. 1 to 3, when the display circuit board 300 is connected to one side of the flexible film, the display pad area DPA and the first and second touch pad areas TPA1 and TPA2 of the pad portion PD may correspond to pads of the display panel 100 connected to the display circuit board 300. Therefore, the pads of the display panel 100 may be in contact with the display pads DP, the first touch pads TP1, and the second touch pads TP2. The display pads DP, the first touch pads TP1, and the second touch pads TP2 may be electrically connected to the pads of the display circuit board 300 using an anisotropic conductive layer or a low-resistance and high-reliability material such as SAP. Therefore, the display pads DP, the first touch pads TP1, and the second touch pads TP2 may be electrically connected to the touch driving circuit 400 located on the display circuit board 300.

The touch driving circuit 400 generates touch driving signals according to the touch driving frequency and driving voltage value set in the firmware based on the touch driving firmware.

The touch driving circuit 400 outputs the touch driving signals from the touch driving electrode TE located at the leftmost side of the touch sensing area TSA to the touch driving electrode TE located at the rightmost side of the touch sensing area TSA at a speed according to the touch driving frequency. In this case, the touch driving circuit 400 may sequentially output the touch driving signals from the touch driving electrode TE located at the leftmost side to the touch driving electrode TE located at the rightmost side. Unlike this, the touch driving circuit 400 may group the touch driving electrodes TE by a preset number of groups according to programming of the firmware, and may output the touch driving signals to the touch driving electrodes TE for each group. In this case, the touch driving signals may be output as a plurality of pulse signals that are generated with a magnitude ranging from about 1.8 V to 2.2 V based on the driving voltage value of the firmware.

The touch driving circuit 400 senses an amount of charge change in mutual capacitance of each of the touch nodes TN from the touch sensing lines RL of the touch sensing unit TSU and the second touch pads TP2. The touch driving circuit 400 may include operational amplifiers for sensing the amount of charge change in the mutual capacitance of the touch nodes TN. Accordingly, the touch driving circuit 400 may sequentially convert output voltages according to the amount of charge change of each of the touch nodes TN amplified by the operational amplifiers into touch data that is digital data. In addition, the touch driving circuit 400 extracts a difference data value by sequentially comparing the touch data for the touch sensing signals with preset sensing reference data. Accordingly, the touch driving circuit 400 may calculate touch position coordinates for touch data having a difference data value greater than an average value among sequentially detected touch data, and supply the touch position coordinates to the display driving circuit 200.

As described with reference to FIGS. 4 and 5, the display driving circuit 200 drives the pixels SP of the display area DA based on previously stored display control firmware, that is, using the display driving frequency, the control signal output timing, and the output voltage values of the display control firmware.

On the other hand, the touch driving circuit 400 drives the touch electrodes SE with the display driving frequency and touch driving signals according to touch driving firmware in units of at least one frame period based on previously stored touch driving firmware.

As described above, the touch driving electrodes TE arranged in parallel in the second direction (Y-axis direction) are connected on both sides to the first and second touch driving lines TL1 and TL2 and receive the touch driving signals. Therefore, it may be possible to prevent or reduce a problem of RC delay occurring between the touch driving signals applied to both sides of the touch driving electrodes TE. In particular, a resistance difference between all touch driving electrodes TE arranged in parallel in the second direction (Y-axis direction) may be minimized or reduced to close to zero.

Meanwhile, one end or the other end of the touch sensing electrodes RE arranged in parallel in the first direction (X-axis direction) are respectively connected to the touch sensing lines RL, but lengths of the touch sensing lines RL are different. In other words, the length of the touch sensing line RL connected to the touch sensing electrode RE located at an end on one side (e.g., an end in an upper direction) of the touch sensing area TSA is the longest, and the length of the touch sensing line RL connected to the touch sensing electrode RE located at an end on the other side (e.g., an end in a lower direction) of the touch sensing area TSA is the shortest. Therefore, the resistance of the touch sensing electrodes RE arranged in parallel in the first direction (X-axis direction) increases toward the end on one side of the touch sensing area TSA, and decreases toward the end on the other side of the touch sensing area TSA. As a result, the resistance difference between the touch driving electrodes TE arranged in parallel in the second direction (Y-axis direction) may be minimized or reduced close to 0, but the resistance differences between the touch sensing electrodes RE arranged in parallel in the first direction (X-axis direction) are different from each other.

When inspecting the touch of the touch driving electrodes TE, the touch sensing electrodes RE, and the touch nodes TN each formed at the intersection portions between the touch driving electrodes TE and the touch sensing electrodes RE that are arranged in the touch sensing unit, the display panel 100 on which the touch sensing unit TSU is formed and the display device 10 are located in a touch inspection device.

During a touch inspection, the touch driving circuit 400 of the display device 10 drives the touch driving electrodes TE based on preset inspection driving firmware and detects touch sensing signals through the touch sensing electrodes RE. Further, the touch driving circuit 400 may calculate the amount of charge change in mutual capacitance of each of the touch nodes TN, and may convert output voltages according to the amount of charge change of each of the touch nodes TN into touch data, which is digital data, and transmit the touch data to the touch inspection device.

Figure 6:
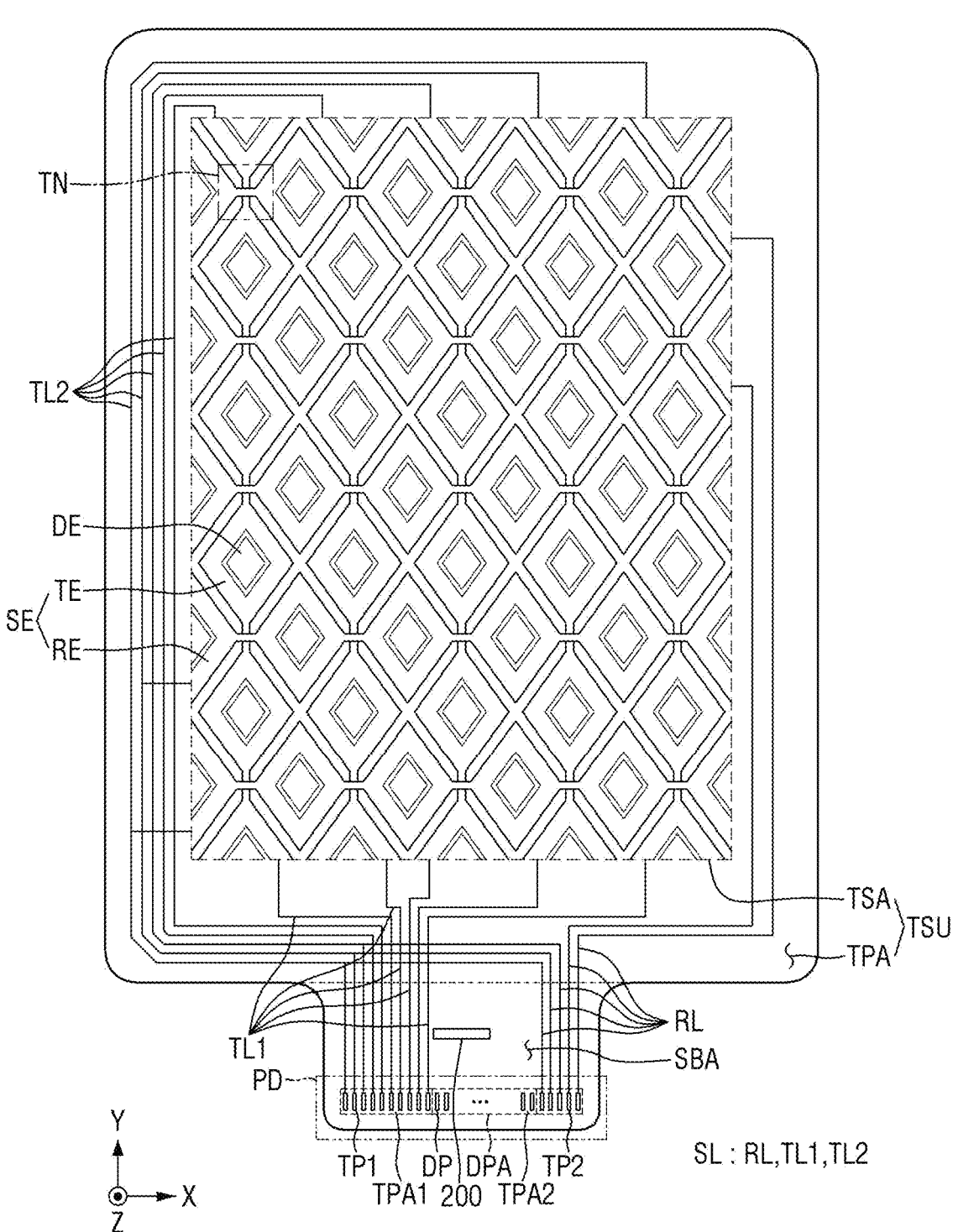
FIG. 6 is a layout view schematically illustrating further details of a structure of the touch sensing unit illustrated in FIG. 3 according to some embodiments.

FIG. 6 is a layout view schematically illustrating a structure according to a second example of the touch sensing unit illustrated in FIG. 3.

Referring to FIG. 6, in the touch sensing electrodes RE located in the upper direction of the touch sensing area TSA with respect to the center of the touch sensing area TSA among the touch sensing electrodes RE electrically connected in the first direction (X-axis direction), each of the touch sensing lines RL may be connected to the touch sensing electrodes RE located at an end in a first side direction (a right direction in the drawing).

On the other hand, in the touch sensing electrodes RE located in the lower direction of the touch sensing area TSA with respect to the center of the touch sensing area TSA among the touch sensing electrodes RE electrically connected in the first direction (X-axis direction), each of the touch sensing lines RL may be connected to the touch sensing electrodes RE located at an end in a second side direction (a left direction in the drawing).

In addition, each of the touch sensing lines RL may be connected to the second touch pads TP2 located on the pad portion PD along a periphery of the touch sensing area TSA in a one-to-one manner.

As illustrated in FIG. 6, the lengths of the touch sensing lines RL respectively connected to the touch sensing electrodes RE in the first or second side directions are different from each other. For example, the length of the touch sensing line RL connected to the touch sensing electrode RE located at an end on one side (e.g., an end in an upper direction) of the touch sensing area TSA may be the longest, and the length of the touch sensing line RL connected to the touch sensing electrode RE located at an end on the other side (e.g., an end in a lower direction) of the touch sensing area TSA may be the shortest. Therefore, the resistance of the touch sensing electrodes RE arranged in parallel in the first direction (X-axis direction) increases toward the end on one side of the touch sensing area TSA, and decreases toward the end on the other side of the touch sensing area TSA. As a result, the resistance differences between the touch sensing electrodes RE arranged in parallel in the first direction (X-axis direction) are different from each other.

Meanwhile, in the touch sensing electrodes RE located in the upper direction of the touch sensing area TSA among the touch sensing electrodes RE electrically connected in the first direction (X-axis direction), each of the touch sensing lines RL is connected to the touch sensing electrodes RE located at the end in the first side direction. In addition, a resistance difference also occurs between the touch sensing electrodes RE arranged in the second side direction compared to the touch sensing electrodes RE in the first side direction to which the touch sensing line RL is connected. That is, the resistance of the touch sensing electrode RE in the first side direction to which the touch sensing line RL is directly connected is the smallest, and as the touch sensing electrode RE moves further away from the touch sensing electrode RE to which the touch sensing line RL is connected in the second side direction, the resistance thereof becomes larger.

On the other hand, in the touch sensing electrodes RE arranged in the lower direction of the touch sensing area TSA among the touch sensing electrodes RE electrically connected in the first direction (X-axis direction), each of the touch sensing lines RL is connected to the touch sensing electrodes RE arranged at the end in the second side direction. Similarly, a resistance difference also occurs between the touch sensing electrodes RE arranged in the first side direction compared to the touch sensing electrodes RE in the second side direction to which the touch sensing line RL is connected. That is, the resistance of the touch sensing electrode RE in the second side direction to which the touch sensing line RL is directly connected is the smallest, and as the touch sensing electrode RE moves further away from the touch sensing electrode RE to which the touch sensing line RL is connected in the first side direction, the resistance thereof becomes larger.

The touch sensing electrodes RE arranged in parallel in the first direction (X-axis direction) have different resistance differences due to one connection direction of the touch sensing lines RL and different lengths of the touch sensing lines RL. During the touch inspection, it is also possible to detect defects in the touch sensing electrodes RE through arithmetic processing processes such as analyzing touch data and comparing and offsetting the touch data in consideration of the connection direction of the touch sensing lines RL and the influence of the lengths of the touch sensing lines RL with respect to the touch sensing electrodes RE.

However, although the resistance difference between the touch driving electrodes TE themselves is close to 0, the touch driving electrodes TE intersect the touch sensing electrodes RE and are affected by the resistance difference between the touch sensing electrodes RE. For example, because the touch driving electrodes TE are electrically connected in the second direction (Y-axis direction), the touch driving electrodes TE are arranged to intersect the touch sensing electrodes RE having different resistance sizes according to the upper and lower directions and the first and second side directions of the touch sensing area TSA. Accordingly, the touch nodes TN formed at the intersection portions of the touch driving electrodes TE and the touch sensing electrodes RE may be affected by the resistance differences of the touch sensing electrodes RE.

During the touch inspection, touch sensing defects and defective sensing locations may be detected by detecting touch data according to changes in capacitance of the touch nodes TN and comparing and analyzing the touch data for each touch node TN. As described above, it is also possible to detect the defects in the touch sensing electrodes RE through arithmetic processing processes of the touch data in consideration of the connection direction of the touch sensing lines RL and the influence of the lengths of the touch sensing lines RL with respect to the touch sensing electrodes RE. However, because the touch driving electrodes TE are affected by the touch sensing electrodes RE having the resistance differences, it is difficult to find or specify the defects in the touch driving electrodes TE, especially which touch driving electrode TE has a defect among the touch driving electrodes TE. Accordingly, the touch inspection device performs a touch inspection to find and specify which touch driving electrode TE has a defect among the touch driving electrodes TE.

For example, the touch driving circuit 400 detects touch data through the touch nodes TN where the touch driving electrodes TE and the touch sensing electrodes RE intersect, and during touch inspection, the touch inspection device aligns the touch data in units of at least one frame.

The touch inspection device may detect touch error data and at least one touch node TN where the touch error data is generated by calculating a deviation of the touch data for each touch node TN according to an arrangement direction of the touch sensing electrodes RE and offsetting the deviation of the touch data for each of the touch nodes TN adjacent to each other.

The touch inspection device may determine a location of at least one touch node TN in which the touch error data occurs as a defect occurrence location, and may detect touch location coordinates for the touch node TN in which the defect occurs and at least one touch driving electrode TE forming the touch node TN in which the defect occurs as the touch driving electrode TE in which the defect occurs.

Figure 7:
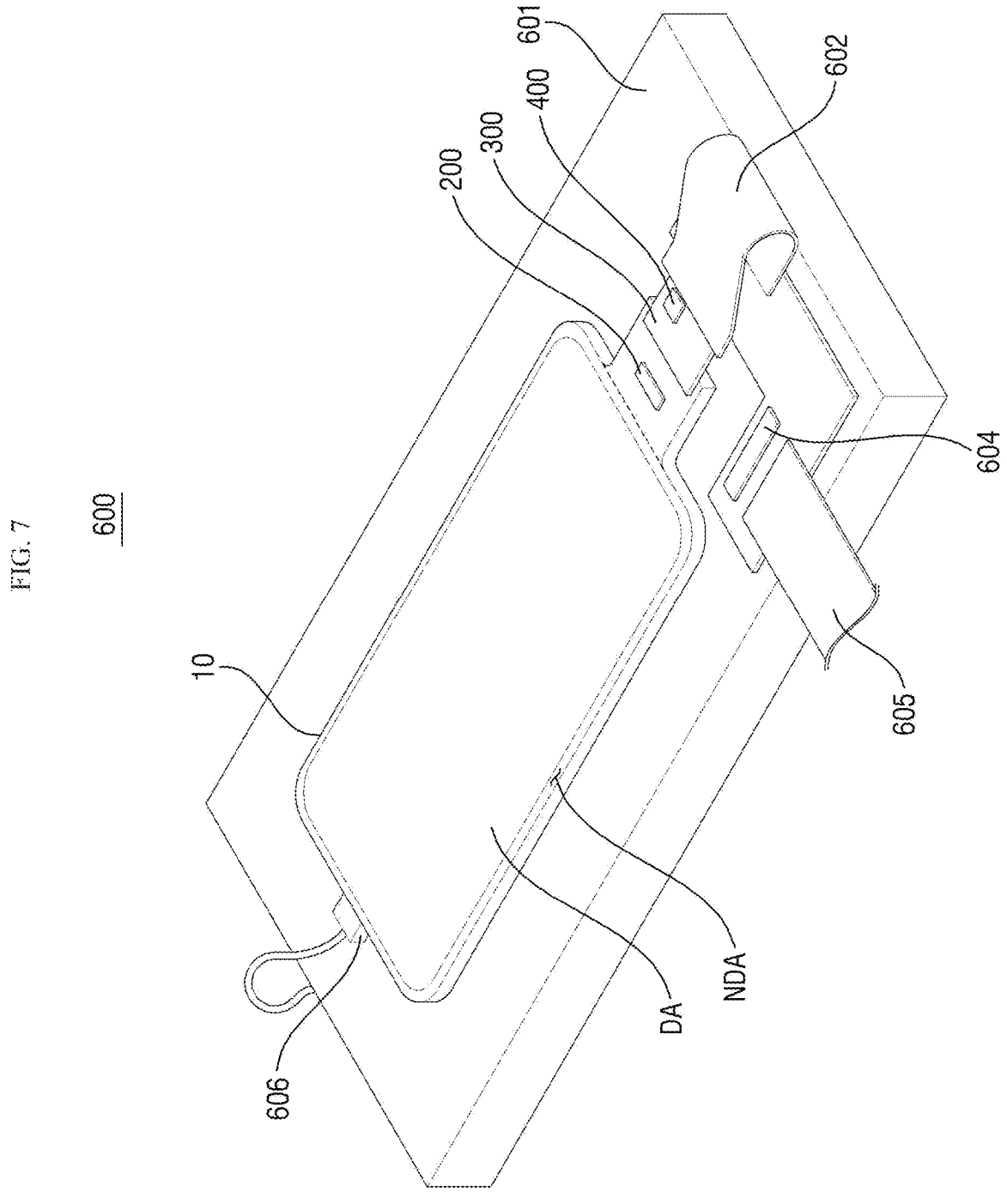
FIG. 7 is a perspective view briefly illustrating a touch inspection device and a touch inspection process of a display device according to some embodiments.

FIG. 7 is a perspective view briefly illustrating a touch inspection device and a touch inspection process of a display device according to some embodiments. In addition, FIG. 8 is a block diagram briefly illustrating components of the touch inspection device of the display device illustrated in FIG. 7.

Figure 8:
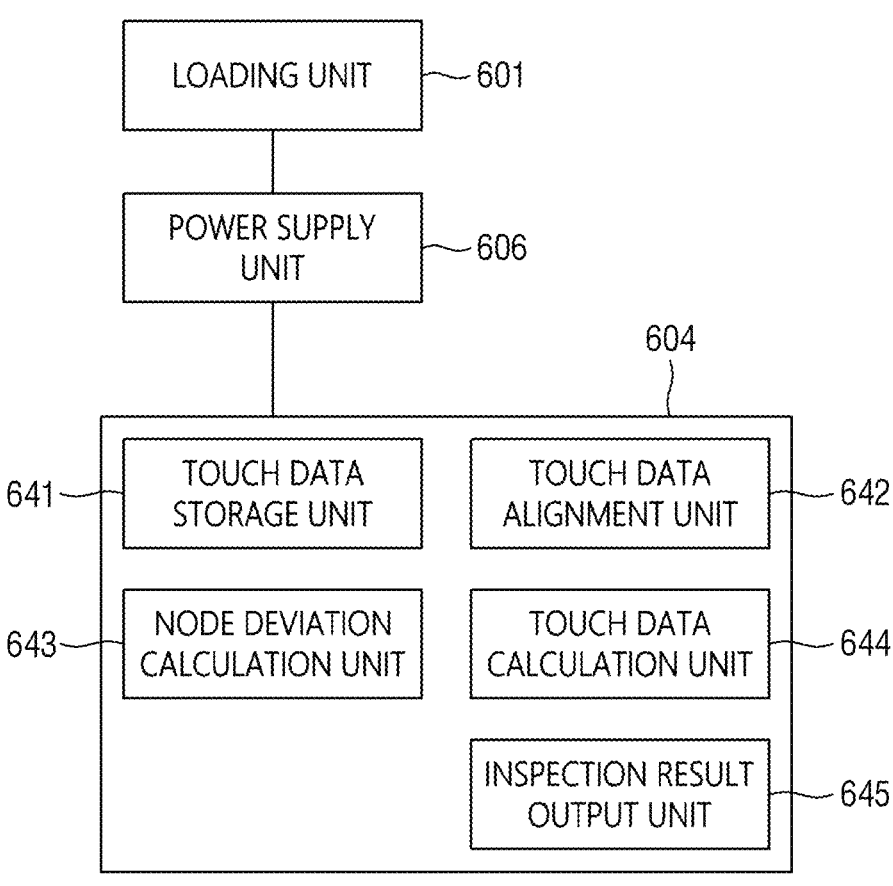
FIG. 8 is a block diagram briefly illustrating components of the touch inspection device of the display device illustrated in FIG. 7 according to some embodiments.

Referring to FIGS. 7 and 8, a touch inspection device 600 of the display device 10 includes a loading unit 601 on which the display device 10 is loaded, a first flexible circuit unit 602, an inspection processing circuit unit (or inspection processing circuit, or inspection processor) 604, a second flexible circuit unit 605, and a power supply unit 606.

The display device 10 in which the touch sensing unit TSU is formed or the display panel 100 in which the touch sensing unit TSU is formed is loaded on the loading unit 601 of the touch inspection device 600.

The power supply unit 606 supplies preset power signals to the display device 10, the display panel 100, and the touch driving circuit 400. The power signals may include a direct current driving voltage source, a timing pulse signal, a gate pulse signal, an alternating current driving voltage source, etc.

The touch driving circuit 400 supplies touch driving signals to the touch driving electrodes TE located in the touch sensing unit TSU of the display device 10, and detects the amount of output voltage and current through the touch driving electrodes TE and the touch sensing electrodes RE and the capacitance of the touch nodes TN. In addition, the touch driving circuit 400 digitally converts the detected output voltage magnitude and capacitance and detects touch signal data for the touch driving electrodes TE, sensing signal data for the touch sensing electrodes RE, and touch data of the touch nodes TN. The touch driving circuit 400 may be located on the display circuit board 300 formed separately from the display device 10. The touch driving circuit 400 may also be formed in the touch inspection device 600 separately from the display device 10.

During the touch inspection, the touch driving circuit 400 supplies touch driving signals to the touch driving electrodes TE through the first and second touch driving lines TL1 and TL2 of the touch sensing unit TSU. In addition, the touch driving circuit 400 may receive the touch driving signals applied to each touch driving electrode TE as feedback through the first touch driving lines TL1 to detect the amount of voltage and current of the touch driving signal applied to each of the touch driving electrodes TE. The touch driving circuit 400 converts the touch driving signals into touch signal data, which is digital data, according to changes in the voltage magnitude and current amount of the touch driving signals and transmits the touch signal data to the inspection processing circuit 604 of the touch inspection device 600.

In addition, the touch driving circuit 400 detects the touch sensing signals for the touch sensing electrodes RE through the touch sensing lines RL respectively connected to the touch sensing electrodes RE. The touch driving circuit 400 converts the touch sensing signals into sensing signal data, which is digital data, according to changes in the voltage magnitude and current amount of the touch sensing signals and transmits the sensing signal data to the inspection processing circuit 604.

The touch driving circuit 400 calculates the amount of charge change in capacitance of each of the touch nodes TN by comparing and calculating the changes in the voltage magnitude and current amount of the touch sensing signals along with the changes in the voltage magnitude and current amount of the touch driving signals using a preset calculation formula. The touch driving circuit 400 converts the output voltages according to the amount of charge change of each of the touch nodes TN into touch data, which is digital data, and transmits the touch data to the inspection processing circuit 604.

The first flexible circuit unit 602 transmits the touch signal data of the touch driving electrodes TE, the sensing signal data of the touch sensing electrodes RE, and the touch data of the touch nodes TN detected from the touch driving circuit 400 to the inspection processing circuit 604.

The inspection processing circuit 604 sequentially receives the touch data detected from the touch nodes TN through the touch driving circuit 400 and aligns the touch data in units of at least one frame. In addition, the inspection processing circuit 604 calculates a deviation of the touch data for each touch node TN according to an arrangement direction of the touch sensing electrodes RE.

The inspection processing circuit 604 detects touch error data and at least one touch node TN in which the touch error data occurs by offsetting the deviations of the touch data for the touch nodes TN adjacent to each other along the arrangement direction of the touch driving electrodes TE.

The inspection processing circuit 604 may determine a location of at least one touch node TN in which the touch error data occurs as a defect occurrence location, and may detect touch location coordinates for the touch node TN in which the defect occurs and at least one touch driving electrode TE forming the touch node TN in which the defect occurs as the touch driving electrode TE in which the defect occurs.

Referring to FIG. 8, the inspection processing circuit 604 of the touch inspection device 600 includes a touch data storage unit 641, a touch data alignment unit 642, a node deviation calculation unit 643, a touch data calculation unit 644, and an inspection result output unit 645.

The touch data storage unit 641 of the inspection processing circuit 604 receives and stores the touch signal data of the touch driving electrodes TE, the sensing signal data of the touch sensing electrodes RE, and the touch data of the touch nodes TN detected from the touch driving circuit 400.

The touch data alignment unit 642 sequentially aligns the touch signal data in units of at least one frame according to an arrangement order and an arrangement structure of the touch driving electrodes TE and the touch sensing electrodes RE. In addition, the touch data alignment unit 642 sequentially arranges the touch data in units of at least one frame according to an intersection structure of the touch driving electrodes TE and the touch sensing electrodes RE and the arrangement structure of the touch nodes TN.

The node deviation calculation unit 643 may calculate deviation values of the touch data for each touch node TN according to the arrangement direction of the touch sensing electrodes RE using a preset deviation calculation equation.

The touch data calculation unit 644 detects touch error data and at least one touch node TN in which the touch error data occurs by offsetting the deviations of the touch data for the touch nodes TN adjacent to each other along the arrangement direction of the touch driving electrodes TE.

For example, the touch data calculation unit 644 may offset the deviations of the touch data for the touch nodes TN adjacent to each other along the arrangement direction of the touch driving electrodes TE using a preset deviation offset calculation formula. In addition, the touch data calculation unit 644 may detect touch error data TNerr according to the deviation offset result and at least one touch node TN in which the touch error data TNerr occurs.

The inspection result output unit 645 determines a location of at least one touch node TN in which the touch error data TNerr occurs as a defect occurrence location, and detects and determines touch location coordinates for the touch node TN in which the defect occurs and at least one touch driving electrode TE forming the touch node TN in which the defect occurs as the touch driving electrode TE in which the defect occurs. The inspection result output unit 645 transmits the determined results to a separate monitor, etc.

Figure 9:
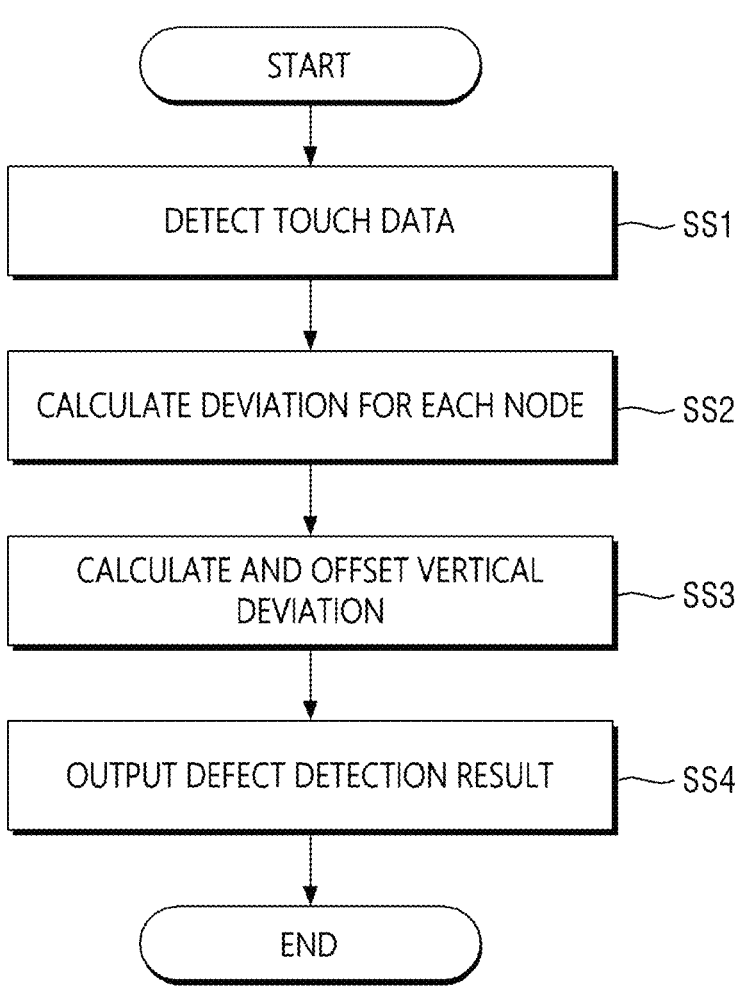
FIG. 9 is a flowchart sequentially illustrating the touch inspection method of the display device according to some embodiments.

FIG. 9 is a flowchart sequentially illustrating the touch inspection method of the display device according to some embodiments.

Referring to FIG. 9, during the touch inspection, the touch driving circuit 400 supplies the touch driving signals to the touch driving electrodes TE located in the touch sensing unit TSU. In addition, the touch driving circuit 400 detects the amount of voltage and current of the touch driving signals applied to each of the touch driving electrodes TE, and detects the touch sensing signals for the touch sensing electrodes RE and the amount of voltage and current of the touch sensing signals. The touch driving circuit 400 detects touch signal data and sensing signal data by digitally converting the detected touch driving signals and touch sensing signals, and capacitance sizes of the touch nodes TN. In this case, the touch driving circuit 400 calculates the amount of charge change in mutual capacitance of each of the touch nodes TN by comparing and calculating the changes in the voltage magnitude and current amount of the touch sensing signals along with the changes in the voltage magnitude and current amount of the touch driving signals. In addition, the touch driving circuit 400 converts output voltages according to the amount of charge change of each of the touch nodes TN into digital touch data and transmits the digital touch data to the inspection processing circuit 604 (SS1).

FIG. 10 is a view illustrating the alignment of touch capacity data for each touch node of the touch sensing unit illustrated in FIG. 6.

Referring to FIG. 10, the touch data storage unit 641 receives the touch signal data of the touch driving electrodes TE, the sensing signal data of the touch sensing electrodes RE, and the touch data of the touch nodes TN detected from the touch driving circuit 400 through the first flexible circuit unit 602.

The touch data alignment unit 642 sequentially aligns the touch signal data in units of at least one frame according to an arrangement order and an arrangement structure of the touch driving electrodes TE and the touch sensing electrodes RE. For example, the touch data alignment unit 642 may distinguish the touch signal data of the touch driving electrodes TE, the sensing signal data of the touch sensing electrodes RE, and the touch data of the touch nodes TN according to the arrangement order and the arrangement structure of the touch driving electrodes TE and the touch sensing electrodes RE and store them in separate memories or registers. In this case, the touch data alignment unit 642 sequentially arranges the touch data in units of at least one frame according to an intersection structure of the touch driving electrodes TE and the touch sensing electrodes RE and the arrangement structure of the touch nodes TN.

FIG. 11 is a view illustrating the results of deviation calculation for the touch capacitance data for each touch node of the touch sensing unit according to some embodiments.

Referring to FIG. 11, the node deviation calculation unit 643 calculates deviation values TNre(x) of the touch data for each touch node TN according to the arrangement direction of the touch sensing electrodes RE using a preset deviation calculation equation, that is, Equation 1 below (SS2).

$$TNre(x) = | Cm \ (RE(x)ave - TN(n)) | \qquad \text{Equation 1}$$

Here, Cm refers to a touch data value according to capacitance, and RE(x)ave is the average data value in the arrangement direction of the touch sensing electrode RE. In addition, TN(n) is a touch data value of each of the touch nodes TN.

FIG. 12 is a view illustrating the results of vertical deviation offset for the touch capacitance data for each touch node according to some embodiments.

Referring to FIG. 12, the touch data calculation unit 644 detects touch error data and at least one touch node TN in which the touch error data occurs by offsetting the deviations of the touch data for the touch nodes TN adjacent to each other along the arrangement direction of the touch driving electrodes TE.

For example, the touch data calculation unit 644 may offset the deviations of the touch data for the touch nodes TN adjacent to each other along the arrangement direction of the touch driving electrodes TE using a preset deviation offset calculation formula, that is, Equation 2 below. In addition, the touch data calculation unit 644 may detect touch error data TNerr according to the deviation offset result and at least one touch node TN in which the touch error data TNerr occurs (SS3).

$$TNerr = | Yn - 1(TNre(x)) - Yn(TNre(x)) | \qquad \text{Equation 2}$$

Here, TNerr is an offset result value of the deviation values, that is, a touch error data value for each of the touch nodes TN. In addition, Yn−1(TNre(x)) and Yn(TNre(x)) are deviation values (TNre_x) for touch nodes TN adjacent to each other along the arrangement direction of the touch driving electrodes TE.

As illustrated in FIG. 12, when the touch error data TNerr according to the deviation offset result does not occur or is detected as 0, it may be confirmed that no defects have occurred in the touch nodes TN or the touch driving electrodes TE.

The inspection result output unit 645 determines a location of at least one touch node TN in which the touch error data TNerr occurs as a defect occurrence location, and detects touch location coordinates for the touch node TN in which the defect occurs and at least one touch driving electrode TE forming the touch node TN in which the defect occurs as the touch driving electrode TE in which the defect occurs. The inspection result output unit 645 transmits the detected results to a separate monitor, etc. (SS4).

FIG. 13 is a view illustrating the results of deviation calculation for the touch capacitance data for each touch node of the touch sensing unit according to some embodiments.

The touch data alignment unit 642 sequentially arranges the touch data of the touch nodes TN in units of each frame according to the intersection structure of the touch driving electrodes TE and the touch sensing electrodes RE and the arrangement structure of the touch nodes TN with respect to the touch data of the touch nodes TN that are sequentially and continuously input.

Referring to FIG. 13, the node deviation calculation unit 643 calculates deviation values TNre(x) of the touch data for each touch node TN according to the arrangement direction of the touch sensing electrodes RE using the preset deviation calculation equation, that is, Equation 1.

FIG. 14 is a view illustrating the results of vertical deviation offset for the touch capacitance data for each touch node according to some embodiments.

Referring to FIG. 14, the touch data calculation unit 644 may offset the deviations of the touch data for the touch nodes TN adjacent to each other along the arrangement direction of the touch driving electrodes TE using the preset deviation offset calculation formula, that is, Equation 2 above. In addition, the touch data calculation unit 644 may detect touch error data TNerr according to the deviation offset result and at least one touch node TN in which the touch error data TNerr occurs.

As illustrated in FIG. 14, when the touch error data TNerr according to the deviation offset result does not occur or is detected as 0, it may be confirmed that no defects have occurred in the touch nodes TN or the touch driving electrodes TE.

However, when the touch error data TNerr according to the deviation offset result has occurred, it may be confirmed that defects have occurred in the touch nodes TN or the touch driving electrodes TE.

The inspection result output unit 645 determines a location of at least one touch node TN in which the touch error data TNerr occurs as a defect occurrence location, and detects touch location coordinates for the touch node TN in which the defect occurs and at least one touch driving electrode TE forming the touch node TN in which the defect occurs as the touch driving electrode TE in which the defect occurs. The inspection result output unit 645 transmits the detected results to a separate monitor, etc.

FIG. 15 is a view illustrating the results of vertical deviation offset for the touch capacitance data for each touch node according to some embodiments. In addition, FIG. 16 is a view illustrating the results of vertical deviation offset for the touch capacitance data for each touch node according to some embodiments.

Figure 16:
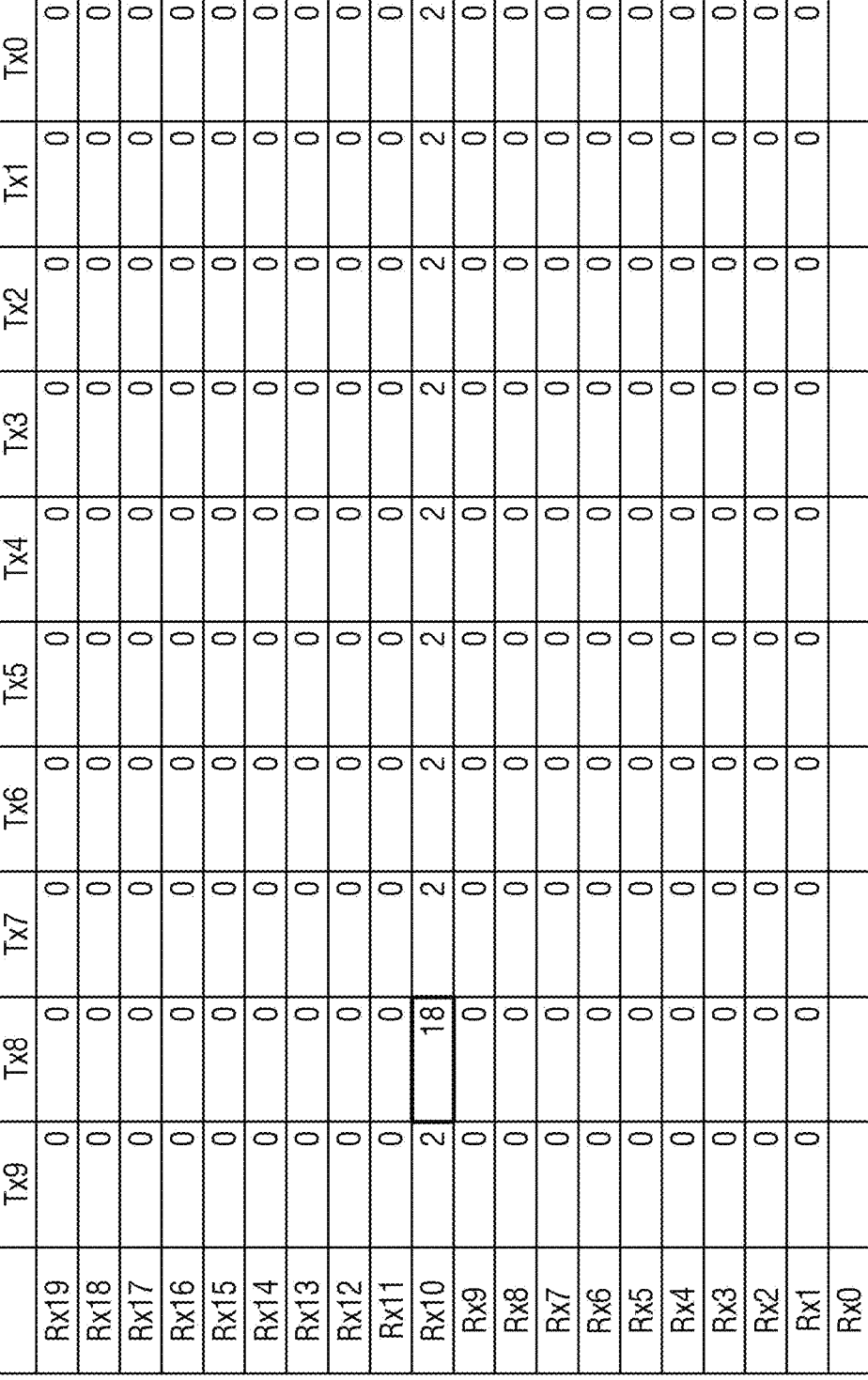
FIG. 16 is a view illustrating the results of vertical deviation offset for the touch capacitance data for each touch node according to some embodiments.

As each illustrated in FIGS. 15 and 16, the touch data calculation unit 644 detects touch error data TNerr and at least one touch node TN in which the touch error data TNerr occurs by offsetting the deviations of the touch data for the touch nodes TN adjacent to each other along the arrangement direction of the touch driving electrodes TE.

When the touch error data TNerr does not occur generated or is detected as 0, it is confirmed that no defects have occurred in the touch nodes TN or the touch driving electrodes TE. That is, it is confirmed as normal. However, as each illustrated in FIGS. 15 and 16, when the touch error data TNerr according to the deviation offset result has occurred, it may be confirmed that defects have occurred in the touch nodes TN or the touch driving electrodes TE.

The inspection result output unit 645 determines a location of at least one touch node TN in which the touch error data TNerr occurs as a defect occurrence location, and detects touch location coordinates for the touch node TN in which the defect occurs and at least one touch driving electrode TE forming the touch node TN in which the defect occurs as the touch driving electrode TE in which the defect occurs.

Figure 17:
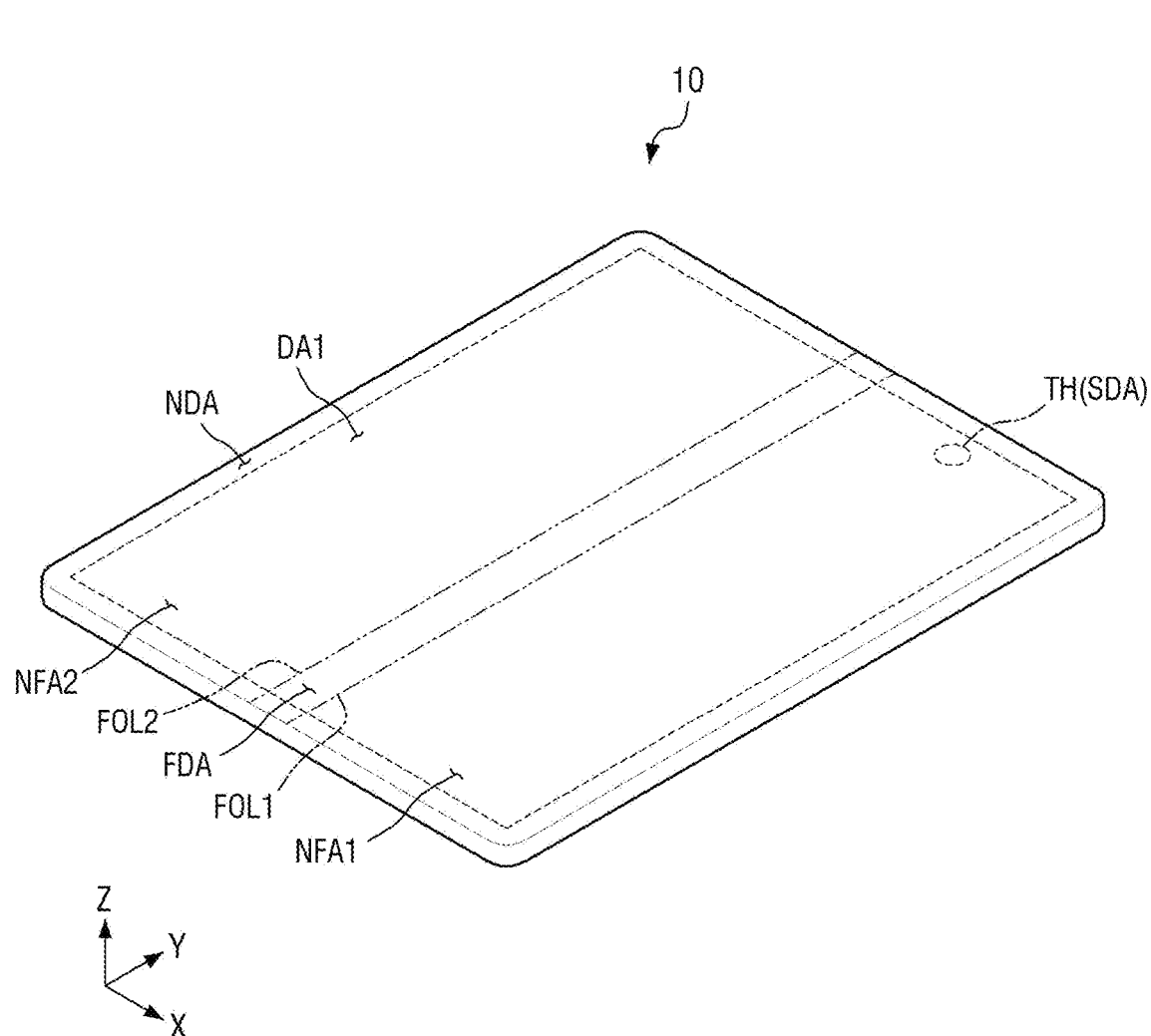
FIGS. 17 and 18 are perspective views illustrating a display device according to some embodiments of the present disclosure.
Figure 18:
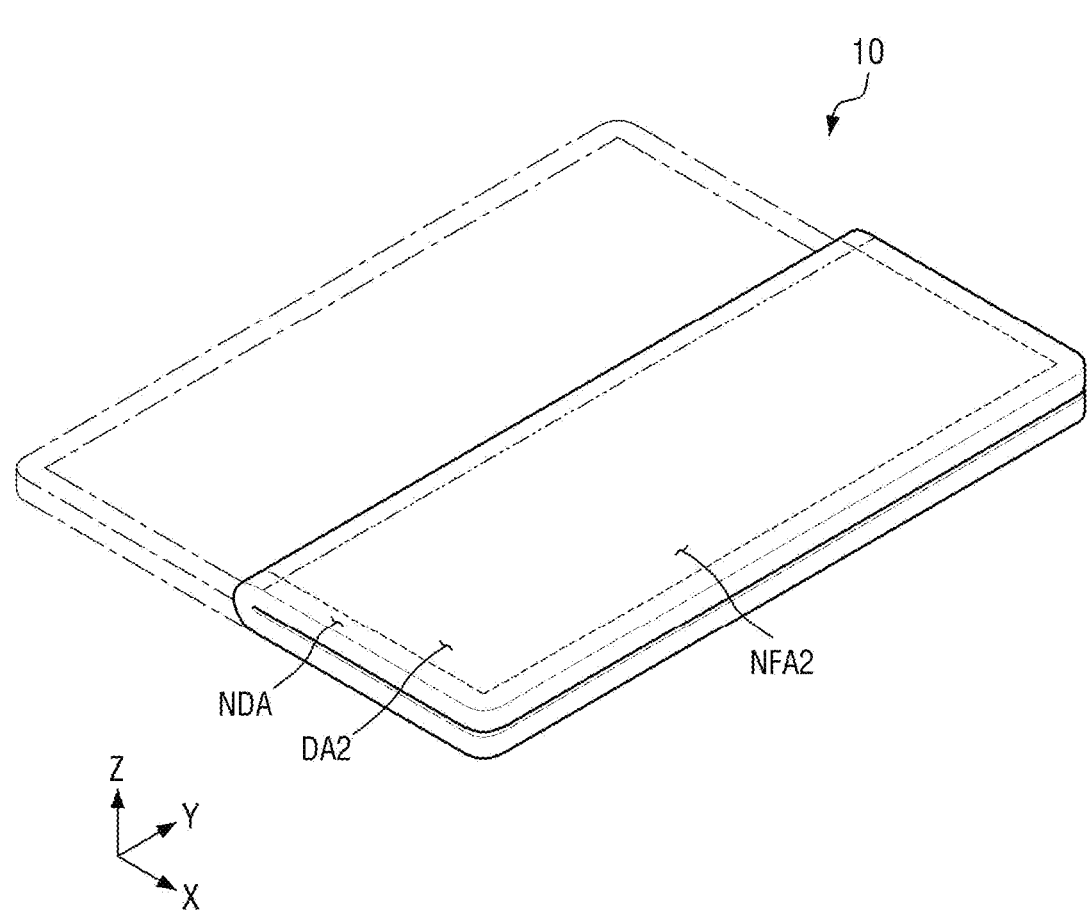

FIGS. 17 and 18 are perspective views illustrating a display device according to some embodiments of the present disclosure.

FIGS. 17 and 18 illustrate that the display device 10 is a foldable display device that is folded in the first direction (X-axis direction). The display device 10 may maintain both a folded state and an unfolded state. The display device 10 may be folded in an in-folding manner in which a front surface thereof is located on an inner side. When the display device 10 is bent or folded in the in-folding manner, the front surfaces of the display device 10 may be arranged to face each other. Alternatively, the display device 10 may be folded in an out-folding manner in which the front surface thereof is located on an outer side. When the display device 10 is bent or folded in the out-folding manner, rear surfaces of the display device 10 may be arranged to face each other.

A first non-folding area NFA1 may be located on one side of a folding area FDA, for example, a right side. A second non-folding area NFA2 may be located on the other side of the folding area FDA, for example, a left side. The touch sensing unit TSU according to some embodiments of the present specification may be formed and located on the first non-folding area NFA1 and the second non-folding area NFA2, respectively.

A first folding line FOL1 and a second folding line FOL2 may extend in the second direction (Y-axis direction), and the display device 10 may be folded in the first direction (X-axis direction). Accordingly, because a length of the display device 10 in the first direction (X-axis direction) may be reduced by about half, it may be convenient for the user to carry the display device 10.

Meanwhile, the extending direction of the first folding line FOL1 and the extending direction of the second folding line FOL2 are not limited to the second direction (Y-axis direction). For example, the first folding line FOL1 and the second folding line FOL2 may extend in the first direction (X-axis direction), and the display device 10 may be folded in the second direction (Y-axis direction). In this case, a length of the display device 10 in the second direction (the Y-axis direction) may be reduced by about half. Alternatively, the first folding line FOL1 and the second folding line FOL2 may extend in a diagonal direction between the first direction (X-axis direction) and the second direction (Y-axis direction) of the display device 10. In this case, the display device 10 may be folded in a triangular shape.

When the first folding line FOL1 and the second folding line FOL2 extend in the second direction (Y-axis direction), a length of the folding area FDA in the first direction (X-axis direction) may be shorter than a length thereof in the second direction (Y-axis direction). In addition, a length of the first non-folding area NFA1 in the first direction (X-axis direction) may be longer than the length of the folding area FDA in the first direction (X-axis direction). A length of the second non-folding area NFA2 in the first direction (X-axis direction) may be longer than the length of the folding area FDA in the first direction (X-axis direction).

A first display area DA1 may be located on the front surface of the display device 10. The first display area DA1 may overlap the folding area FDA, the first non-folding area NFA1, and the second non-folding area NFA2. Therefore, when the display device 10 is unfolded, an image may be displayed in a front direction in the folding area FDA, the first non-folding area NFA1, and the second non-folding area NFA2 of the display device 10.

A second display area DA2 may be located on the rear surface of the display device 10. The second display area DA2 may overlap the second non-folding area NFA2. Therefore, when the display device 10 is folded, an image may be displayed in the front direction in the second non-folding area NFA2 of the display device 10.

FIGS. 17 and 18 illustrate that a through hole TH in which a camera SDA is formed is located in the first non-folding area NFA1, but embodiments according to the present disclosure are not limited thereto. The through hole TH or the camera SDA may be located in the second non-folding area NFA2 or the folding area FDA.

Figure 19:
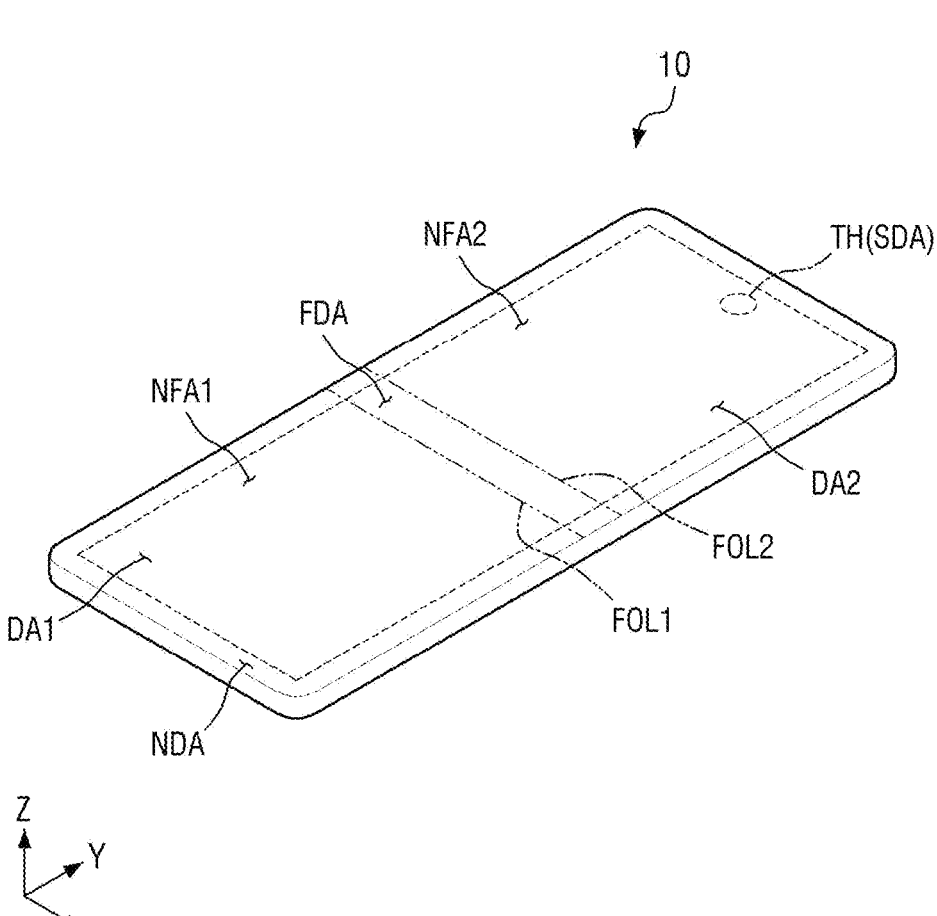
FIGS. 19 and 20 are perspective views illustrating a display device according to some embodiments of the present disclosure.
Figure 20:
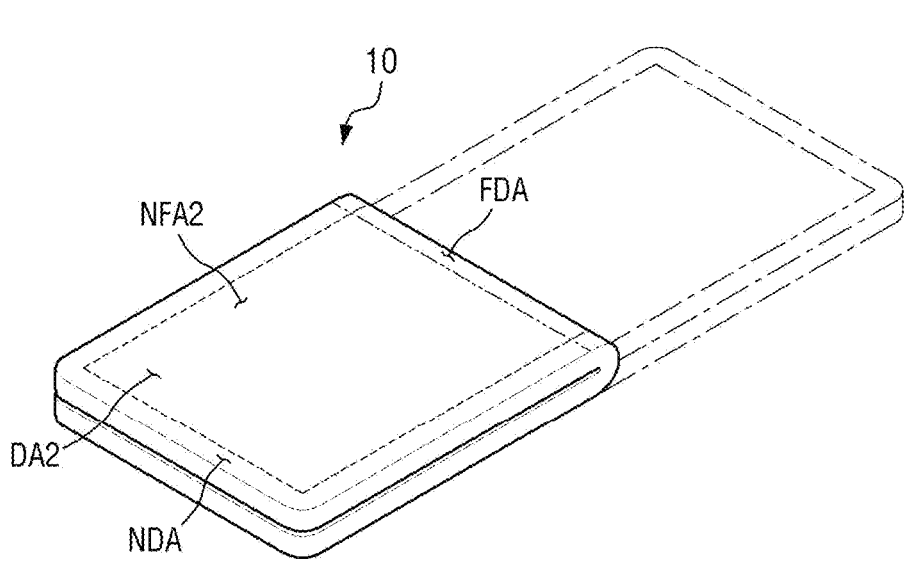
Figure 20:

FIGS. 19 and 20 are perspective views illustrating a display device according to some embodiments of the present disclosure.

It is illustrated in FIGS. 19 and 20 that the display device 10 is a foldable display device that is folded in the second direction (Y-axis direction). The display device 10 may maintain both a folded state and an unfolded state. The display device 10 may be folded in an in-folding manner in which a front surface thereof is located on an inner side. When the display device 10 is bent or folded in the in-folding manner, the front surfaces of the display device 10 may be arranged to face each other. Alternatively, the display device 10 may be folded in an out-folding manner in which the front surface thereof is located on an outer side. When the display device 10 is bent or folded in the out-folding manner, rear surfaces of the display device 10 may be arranged to face each other.

The display device 10 may include a folding area FDA, a first non-folding area NFA1, and a second non-folding area NFA2. The folding area FDA may be an area in which the display device 10 is folded, and the first non-folding area NFA1 and the second non-folding area NFA2 may be areas in which the display device 10 is not folded. The first non-folding area NFA1 may be located on one side of the folding area FDA, for example, a lower side. The second non-folding area NFA2 may be located on the other side of the folding area FDA, for example, an upper side.

The touch sensing unit TSU according to some embodiments of the present specification may be formed and located on the first non-folding area NFA1 and the second non-folding area NFA2, respectively.

On the other hand, the folding area FDA may be an area bent with a predetermined curvature at the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

As illustrated in FIGS. 19 and 20, the first folding line FOL1 and the second folding line FOL2 may extend in the first direction (X-axis direction), and the display device 10 may be folded in the second direction (Y-axis direction). Accordingly, because a length of the display device 10 in the second direction (Y-axis direction) may be reduced by about half, it may be convenient for a user to carry the display device 10.

Meanwhile, the extending direction of the first folding line FOL1 and the extending direction of the second folding line FOL2 are not limited to the first direction (X-axis direction). For example, the first folding line FOL1 and the second folding line FOL2 may extend in the second direction (Y-axis direction), and the display device 10 may be folded in the first direction (X-axis direction). In this case, a length of the display device 10 in the first direction (X-axis direction) may be reduced by about half. Alternatively, the first folding line FOL1 and the second folding line FOL2 may extend in a diagonal direction between the first direction (X-axis direction) and the second direction (Y-axis direction) of the display device 10. In this case, the display device 10 may be folded in a triangular shape.

When the first folding line FOL1 and the second folding line FOL2 extend in the first direction (X-axis direction) as illustrated in FIGS. 19 and 20, a length of the folding area FDA in the second direction (Y-axis direction) may be shorter than a length thereof in the first direction (X-axis direction). In addition, a length of the first non-folding area NFA1 in the second direction (Y-axis direction) may be longer than the length of the folding area FDA in the second direction (Y-axis direction). In addition, a length of the second non-folding area NFA2 in the second direction (Y-axis direction) may be longer than the length of the folding area FDA in the second direction (Y-axis direction).

A first display area DA1 may be located on the front surface of the display device 10. The first display area DA1 may overlap the folding area FDA, the first non-folding area NFA1, and the second non-folding area NFA2. Therefore, when the display device 10 is unfolded, an image may be displayed in a front direction in the folding area FDA, the first non-folding area NFA1, and the second non-folding area NFA2 of the display device 10.

A second display area DA2 may be located on the rear surface of the display device 10. The second display area DA2 may overlap the second non-folding area NFA2. Therefore, when the display device 10 is folded, an image may be displayed in the front direction in the second non-folding area NFA2 of the display device 10.

FIGS. 19 and 20 illustrate that a through hole TH in which a camera SDA is located is located in the second non-folding area NFA2, but embodiments according to the present disclosure are not limited thereto. The through hole TH may be located in the first non-folding area NFA1 or the folding area FDA.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the disclosed embodiments of the present invention.

In concluding the detailed description, those skilled in the art will appreciate that many variations and modifications can be made to the disclosed embodiments without substantially departing from the principles of embodiments according to the present disclosure. Therefore, the disclosed embodiments of the disclosure are used in a generic and descriptive sense only and not for purposes of limitation.

What is claimed is:

1. A touch inspection device of a display device, the touch inspection device comprising:
   a loading substrate on which a display device is loaded;
   a touch driving circuit configured to drive touch driving electrodes and touch sensing electrodes on a touch sensing unit of the display device, and to detect touch data for touch nodes formed at intersection portions of the touch driving electrodes and the touch sensing electrodes; and
   an inspection processing circuit configured to calculate deviations of the touch data according to a preset deviation calculation equation:

$$TNre(x) = |Cm\ (RE(x)ave - TN(n))|$$

Cm is a touch data value according to a capacitance, RE(x)ave is an average data value in an arrangement direction of the touch sensing electrodes, and TN(n) is a touch data value of each of the touch nodes, to detect touch error data at at least one touch node in which the touch error data occurs by offsetting the deviations of touch data for each of the touch nodes adjacent to each other, and to detect a defect occurrence location for the at least one touch node in which the touch error data occurs.

2. The touch inspection device of claim 1, wherein the touch sensing electrodes are arranged in parallel in a first direction in a touch sensing area of the touch sensing unit, and the touch driving electrodes are arranged in parallel in a second direction intersecting the touch sensing electrodes, touch sensing electrodes in an upper direction in the second direction with respect to a center of the touch sensing area among the touch sensing electrodes are electrically connected to the touch driving circuit through touch sensing lines connected in a first side direction, and touch sensing electrodes in a lower direction in the second direction with respect to the center of the touch sensing area among the touch sensing electrodes are electrically connected to the touch driving circuit through touch sensing lines connected in a second side direction opposite to the first side direction.

3. The touch inspection device of claim 1, wherein the inspection processing circuit is configured to:

align the touch data for the touch nodes in units of at least one frame, calculate a deviation of the touch data for the at least one frame according to the arrangement direction of the touch sensing electrodes, detect the touch error data and the at least one touch node in which the touch error data occurs by offsetting the deviations of the touch data adjacent to each other along an arrangement direction of the touch driving electrodes, and determine a location of the at least one touch node in which the touch error data occurs to be a defect occurrence location.

4. The touch inspection device of claim 3, wherein the inspection processing circuit is configured to:

detect at least one touch location coordinate for the at least one touch node determined to be the defect occurrence location, detect at least one touch driving electrode that intersects the at least one touch node determined to be the defect occurrence location as a touch driving electrode in which a defect occurs, and display on a monitor detection results for the at least one touch location coordinate determined to be the defect occurrence location and the touch driving electrode in which the defect occurs.

5. The touch inspection device of claim 1, wherein the inspection processing circuit includes:

a touch data storage unit configured to align the touch data for the touch nodes in units of at least one frame according to an arrangement order and an arrangement structure of the touch driving electrodes and the touch sensing electrodes;

a node deviation calculation unit configured to calculate the deviations of the touch data for the at least one frame according to the arrangement direction of the touch sensing electrodes;

a touch data calculation unit configured to detect the touch error data and the at least one touch node in which the touch error data occurs by offsetting the deviations of the touch data adjacent to each other according to an arrangement direction of the touch driving electrodes; and an inspection result output unit configured to determine a location of the at least one touch node in which the touch error data occurs to be a defect occurrence location.

6. The touch inspection device of claim 5, wherein the node deviation calculation unit is configured to calculate an average data value for the touch data in the arrangement direction of the touch sensing electrodes, and to calculate deviations for the touch data of the touch nodes using the average data value according to the arrangement direction of the touch sensing electrodes.

7. The touch inspection device of claim 5, wherein the node deviation calculation unit is configured to calculate deviation values for the touch data of the touch nodes according to the arrangement direction of the touch sensing electrodes using the preset deviation calculation equation.

8. The touch inspection device of claim 5, wherein a touch data calculation unit is configured to detect the touch error data and the at least one touch node in which the touch error data occurs by offsetting the deviations of the touch data for the touch nodes adjacent to each other according to the arrangement direction of the touch driving electrodes.

9. The touch inspection device of claim 5, wherein the touch data calculation unit is configured to:

offset deviations of the touch data for the touch nodes adjacent to each other according to the arrangement direction of the touch driving electrodes using a preset deviation offset calculation equation:

$$TNerr = |Yn - 1(TNre(x)) - Yn(TNre(x))|, \text{ and}$$

detect the touch error data and the at least one touch node in which the touch error data according to the deviation offset result, and TNerr is a touch error data value according to the off result of deviation values, and Yn−1(TNre(x)) and Yn(TNre(x)) are deviation values for the touch nodes adjacent to each other along the arrangement direction of the touch driving electrodes.

10. The touch inspection device of claim 5, wherein the inspection result output unit is configured to:

detect at least one touch location coordinate for the at least one touch node determined to be the defect occurrence location, detect at least one touch driving electrode that intersects the at least one touch node determined to be the defect occurrence location as a touch driving electrode in which a defect occurs, and display on a monitor detection results for the at least one touch location coordinate determined to be the defect occurrence location and the touch driving electrode in which the defect occurs.

11. A touch inspection method of a display device, the touch inspection method comprising:

loading a display device onto a loading substrate driving touch driving electrodes and touch sensing electrodes on a touch sensing unit of the display device, and detecting touch data for touch nodes formed at intersection portions of the touch driving electrodes and the touch sensing electrodes, through a touch driving circuit; and calculating deviations of the touch data according to a preset deviation calculation equation:

$$TNre(x) = |Cm\ (RE(x)ave - TN(n))|$$

Cm is a touch data value according to a capacitance, RE(x) ave is an average data value in an arrangement direction of the touch sensing electrodes, and TN(n) is a touch data value of each of the touch nodes, detecting touch error data at at least one touch node in which the touch error data occurs by offsetting the deviations of touch data for each of the touch nodes adjacent to each other, and detecting a defect occurrence location for the at least one touch node in which the touch error data occurs, by using an inspection processing circuit.

12. The touch inspection method of claim 11, wherein the touch sensing electrodes are arranged in parallel in a first direction in a touch sensing area of the touch sensing unit, and the touch driving electrodes are arranged in parallel in a second direction intersecting the touch sensing electrodes, touch sensing electrodes in an upper direction in the second direction with respect to a center of the touch sensing area among the touch sensing electrodes are electrically connected to the touch driving circuit through touch sensing lines connected in a first side direction, and touch sensing electrodes in a lower direction in the second direction with respect to the center of the touch sensing area among the touch sensing electrodes are electrically connected to the touch driving circuit through touch sensing lines connected in a second side direction opposite to the first side direction.

13. The touch inspection method of claim 11, wherein the detecting of the defect occurrence location for the at least one touch node in which the touch error data occurs includes:

aligning the touch data for the touch nodes in units of at least one frame;

calculating the deviations of the touch data for the at least one frame according to the arrangement direction of the touch sensing electrodes;

detecting the touch error data and the at least one touch node in which the touch error data occurs by offsetting the deviations of the touch data adjacent to each other according to an arrangement direction of the touch driving electrodes; and determining a location of the at least one touch node in which the touch error data occurs to be a defect occurrence location.

14. The touch inspection method of claim 13, wherein the determining of the location of the at least one touch node in which the touch error data occurs to be the defect occurrence location includes:

detecting at least one touch location coordinate for the at least one touch node determined to be the defect occurrence location;

detecting at least one touch driving electrode that intersects the at least one touch node determined to be the defect occurrence location as a touch driving electrode in which a defect occurs; and displaying, on a monitor, detection results for the at least one touch location coordinate determined to be the defect occurrence location and the touch driving electrode in which the defect occurs.

15. The touch inspection method of claim 11, wherein the detecting of the defect occurrence location for the at least one touch node in which the touch error data occurs includes:

aligning the touch data for the touch nodes in a touch data storage unit in units of at least one frame according to an arrangement order and an arrangement structure of the touch driving electrodes and the touch sensing electrodes;

a node deviation calculation operation of calculating the deviations of the touch data for the at least one frame according to the arrangement direction of the touch sensing electrodes;

a touch data calculation operation of detecting the touch error data and the at least one touch node in which the touch error data occurs by offsetting the deviations of the touch data adjacent to each other according to an arrangement direction of the touch driving electrodes; and an inspection result output operation of determining a location of the at least one touch node in which the touch error data occurs to be a defect occurrence location.

16. The touch inspection method of claim 15, wherein the node deviation calculation operation includes:

calculating an average data value for the touch data in the arrangement direction of the touch sensing electrodes; and calculating deviations for the touch data of the touch nodes using the average data value according to the arrangement direction of the touch sensing electrodes.

17. The touch inspection method of claim 15, wherein in the node deviation calculation operation, deviation values for the touch data of the touch nodes are calculated according to the arrangement direction of the touch sensing electrodes using the preset deviation calculation equation.

18. The touch inspection method of claim 15, wherein in the touch data calculation operation, the touch error data and the at least one touch node in which the touch error data occurs are detected by offsetting the deviations of the touch data for the touch nodes adjacent to each other according to the arrangement direction of the touch driving electrodes.

19. The touch inspection method of claim 15, wherein in the touch data calculation operation, deviations of the touch data for the touch nodes adjacent to each other according to the arrangement direction of the touch driving electrodes are offset using a preset deviation offset calculation equation:

$$TNerr = |Yn - 1(TNre(x)) - Yn(TNre(x))|, \text{ and}$$

the touch error data and the at least one touch node in which the touch error data are detected according to the deviation offset result, and TNerr is a touch error data value according to the off result of deviation values, and Yn−1(TNre(x)) and Yn(TNre(x)) are deviation values for the touch nodes adjacent to each other along the arrangement direction of the touch driving electrodes.

20. The touch inspection method of claim 15, wherein the inspection result output operation includes:

detecting at least one touch location coordinate for the at least one touch node determined to be the defect occurrence location;

detecting at least one touch driving electrode that intersects the at least one touch node determined to be the defect occurrence location as a touch driving electrode in which a defect occurs; and displaying on a monitor detection results for the at least one touch location coordinate determined to be the defect occurrence location and the touch driving electrode in which the defect occurs.

* * * * *